(12) United States Patent
Katayama et al.

(10) Patent No.: US 11,544,111 B2
(45) Date of Patent: Jan. 3, 2023

(54) SENSOR DEVICE, SENSOR DEVICE MANAGEMENT SYSTEM, AND SENSOR DEVICE MANAGEMENT METHOD

(71) Applicant: Hitachi, Ltd., Tokyo (JP)

(72) Inventors: Rintaro Katayama, Tokyo (JP);
Ryosuke Fujiwara, Tokyo (JP);
Kenichi Mizugaki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 358 days.

(21) Appl. No.: 16/789,472

(22) Filed: Feb. 13, 2020

(65) Prior Publication Data

US 2020/0272516 A1     Aug. 27, 2020

(30) Foreign Application Priority Data

Feb. 27, 2019 (JP) .............................. JP2019-034604

(51) Int. Cl.
*G06F 11/34* (2006.01)
*G06F 9/54* (2006.01)
(Continued)

(52) U.S. Cl.
CPC ............. *G06F 9/4887* (2013.01); *G01M 3/00* (2013.01); *G01V 1/008* (2013.01); *G06F 9/4818* (2013.01);
(Continued)

(58) Field of Classification Search
CPC .. G06F 9/4887; G06F 9/4818; G06F 11/3089; G06F 11/3466; G06F 11/3476;
(Continued)

(56) References Cited

U.S. PATENT DOCUMENTS

2016/0021434 A1   1/2016   Arakawa et al.
2016/0261481 A1   9/2016   Ogata et al.
(Continued)

FOREIGN PATENT DOCUMENTS

JP   2010-028168 A   2/2010
JP   2011-90500 A    5/2011
(Continued)

OTHER PUBLICATIONS

Umar Hamid et al., Performance Comparison of Time-Domain and Frequency-Domain Beamforming Techniques for Sensor Array Processing, 2014 IEEE, [Retrieved on Jul. 25, 2022]. Retrieved from the internet: <URL: https://ieeexplore.ieee.org/stamp/stamp.jsp?arnumber=6778172> 7 Pages (379-385) (Year: 2014).*
(Continued)

*Primary Examiner* — Anibal Rivera
(74) *Attorney, Agent, or Firm* — Mattingly & Malur, PC

(57) ABSTRACT

A processor of a sensor device performs measurement processing by one or a plurality of sensors and transmission processing of sensor data generated by the measurement processing. The sensor device includes a processing routine table that stores a processing routine configured to include, corresponding to an identifier for identifying processing performed by a processor, a type of the processing, an execution trigger of the processing, and trigger information that prescribes a trigger for transmitting the sensor data. The processor controls processing in a processing routine of the processing routine table, based on trigger information, so that the sensor data subjected to measurement processing is immediately transmitted, or temporarily stored in a buffer and transmitted after a predetermined time.

12 Claims, 29 Drawing Sheets

(51) Int. Cl.
  *G06F 9/48* (2006.01)
  *G01M 3/00* (2006.01)
  *G01V 1/00* (2006.01)
  *G01V 1/02* (2006.01)
  *G01V 1/16* (2006.01)
  *G01V 1/22* (2006.01)
  *G06F 11/36* (2006.01)
  *G06F 11/30* (2006.01)
  *G01V 1/24* (2006.01)

(52) U.S. Cl.
  CPC .................. *G01V 1/02* (2013.01); *G01V 1/16* (2013.01); *G01V 1/22* (2013.01); *G01V 1/24* (2013.01); *G06F 11/3089* (2013.01); *G06F 11/3466* (2013.01); *G06F 11/3476* (2013.01); *G06F 11/3612* (2013.01)

(58) Field of Classification Search
  CPC ...... G06F 11/3612; G01M 3/00; G01V 1/008; G01V 1/02; G01V 1/16; G01V 1/22; G01V 1/24; G01V 1/28
  See application file for complete search history.

(56) References Cited

U.S. PATENT DOCUMENTS

2017/0083386 A1* 3/2017 Wing .................. G06F 1/30
2018/0189242 A1* 7/2018 Fukushima ............. G06F 17/18
2019/0318283 A1* 10/2019 Kelly ................. G06Q 10/1095
2020/0213193 A1* 7/2020 Newell .................. H04W 8/18

FOREIGN PATENT DOCUMENTS

JP    2016-163242 A    9/2016
WO    2014/142162 A1   9/2014

OTHER PUBLICATIONS

Cesare Alippi et al., An Adaptive Sampling Algorithm for Effective Energy Management in Wireless Sensor Networks With Energy-Hungry Sensors, 2010 IEEE, [Retrieved on Jul. 25, 2022]. Retrieved from the internet: <URL: https://ieeexplore.ieee.org/stamp/stamp.jsp?arnumber=5208303> 10 Pages (335-344) (Year: 2010).*
Japanese Office Action received in corresponding Japanese Application No. 2019-034604 dated Jun. 21, 2022.

* cited by examiner

FIG. 4

| PROCESSING ID | Enable | PROCESSING TYPE | EXECUTION TRIGGER | EXECUTION TIME | EXECUTION CYCLE | TRANSMISSION TRIGGER | PARAMETER SET NUMBER |
|---|---|---|---|---|---|---|---|
| 1 | Enabled | STATE | TIME | 03:00 | 24 HOURS | BATCH | 0 |
| 2 | Enabled | WATER LEAKAGE | TIME | 01:00 | 24 HOURS | BATCH | 1 |
| 3 | Disabled | WATER LEAKAGE | TIME | 02:00 | 26 HOURS | BATCH | 2 |
| 4 | Enabled | OTHER CONSTRUCTION | TIME | 00:00 | 5 MINUTES | IMMEDIATE | 1 |
| 5 | Enabled | EARTHQUAKE | EVENT | - | - | IMMEDIATE | 0 |
| 6 | Enabled | BATCH TRANSMISSION | TIME | 04:00 | 24 HOURS | - | 1 |

| | | PARAMETER SET ID | | |
|---|---|---|---|---|
| | | 0 | 1 | 2 |
| PARAMETER ID (PARAMETER NAME) | 01 (MEASUREMENT PERIOD) | 16 | 32 | 32 |
| | 02 (FFT POINTS) | 2048 | 2048 | 2048 |
| | 03 (OBSERVATION START FREQUENCY) | 100 | 100 | 300 |
| | 04 (OBSERVATION END FREQUENCY) | 1000 | 500 | 400 |
| | 05 (OBSERVATION FREQUENCY POINTS) | 10 | 10 | 40 |
| | 06 (QUANTIZATION BIT) | 2 | 3 | 8 |
| | 07 (DETERMINATION THRESHOLD) | 5 | 5 | 10 |
| | ⋮ | ⋮ | ⋮ | ⋮ |

FIG. 17

| SENSOR DEVICE ID = 1 | INFORMATION TYPE = ROUTINE UPDATE MESSAGE | TIME | VERSION = 1 | COMMAND TYPE = ROUTINE ADDITION /CHANGE | PROCESSING ID = 2 | PROCESSING TYPE = WATER LEAKAGE | Enable =Disabled | PROCESSING ID = 3 | PROCESSING TYPE = WATER LEAKAGE | Enable =Enabled |

| PROCESSING ID | Enable | PROCESSING TYPE | EXECUTION TRIGGER | EXECUTION TIME | EXECUTION CYCLE | TRANSMISSION TRIGGER | PARAMETER SET NUMBER |
|---|---|---|---|---|---|---|---|
| 1 | Enabled | STATE | TIME | 03:00 | 24 HOURS | BATCH | 0 |
| 2 | Disabled | WATER LEAKAGE | TIME | 01:00 | 24 HOURS | BATCH | 1 |
| 3 | Enabled | WATER LEAKAGE | TIME | 02:00 | 26 HOURS | BATCH | 2 |
| 4 | Enabled | OTHER CONSTRUCTION | TIME | 00:00 | 5 MINUTES | IMMEDIATE | 1 |
| 5 | Enabled | EARTHQUAKE | EVENT | - | - | IMMEDIATE | 0 |
| 6 | Enabled | BATCH TRANSMISSION | TIME | 04:00 | 24 HOURS | - | 1 |

FIG. 19

| PROCESSING ID | Enable | PROCESSING TYPE | EXECUTION TRIGGER | EXECUTION TIME | EXECUTION CYCLE | TRANSMISSION TRIGGER | AT-TIME-OF-DUPLICATION | PRIORITY | PARAMETER SET NUMBER |
|---|---|---|---|---|---|---|---|---|---|
| 1 | Enabled | STATE | TIME | 03:00 | 24 HOURS | BATCH | AFTER-END | 5 | 0 |
| 2 | Enabled | WATER LEAKAGE | TIME | 01:00 | 24 HOURS | BATCH | AFTER-END | 10 | 1 |
| 3 | Disabled | WATER LEAKAGE | TIME | 02:00 | 26 HOURS | BATCH | AFTER-END | 11 | 2 |
| 4 | Enabled | OTHER CONSTRUCTION | TIME | 00:00 | 5 MINUTES | IMMEDIATE | CANCEL | 3 | 1 |
| 5 | Enabled | EARTHQUAKE | EVENT | - | - | IMMEDIATE | INTERRUPT | 1 | 0 |
| 6 | Enabled | BATCH TRANSMISSION | TIME | 04:00 | 24 HOURS | - | AFTER-END | 4 | 1 |

SENSOR DEVICE LIST ~2301

| SENSOR DEVICE ID | STATE | INSTALLATION AREA | LAST REPORT DATE AND TIME | ROUTINE TABLE CONFIRMATION | PARAMETER SET CONFIRMATION |
|---|---|---|---|---|---|
| 1 | Normal | A | 2018/12/17 01:00:00 | ○ | ○ |
| 2 | Normal | A | 2018/12/17 01:03:30 | ○ | ○ |
| 3 | Deactivated | B | 2018/12/13 02:30:00 | ○ | ○ |
| 4 | Unreachable | B | 2018/12/12 01:08:00 | ○ | ○ |
| 5 | Normal | C | 2018/12/17 00:55:30 | ○ | ○ |

AREA   GROUP   CONFIRMATION

[SENSOR DEVICE ID = 1] ROUTINE TABLE LIST

| PROCESSING ID | Enable | PROCESSING TYPE | EXECUTION TRIGGER | EXECUTION TIME | EXECUTION CYCLE | TRANSMISSION TRIGGER | PARAMETER SET |
|---|---|---|---|---|---|---|---|
| 1 | Enabled | STATE | TIME | 03:00 | 24 HOURS | BATCH | 0 |
| 2 | Enabled | WATER LEAKAGE | TIME | 01:00 | 24 HOURS | BATCH | 1 |
| 3 | Disabled | WATER LEAKAGE | TIME | 02:00 | 26 HOURS | BATCH | 2 |
| 4 | Disabled | OTHER CONSTRUCTION | TIME | 00:00 | 5 MINUTES | IMMEDIATE | 1 |
| 5 | Enabled | EARTHQUAKE | EVENT | - | - | IMMEDIATE | 0 |
| 6 | Enabled | BATCH TRANSMISSION | TIME | 04:00 | 24 HOURS | - | 1 |

ROW ADDITION   UPDATE   PARAMETER SET CONFIRMATION   DELETION

FIG. 25

| SENSOR DEVICE LIST | | | 2301 | 2321 AREA | GROUP | 2322 |
|---|---|---|---|---|---|---|
| SENSOR DEVICE ID | STATE | INSTALLATION AREA | LAST REPORT DATE AND TIME | ROUTINE TABLE CONFIRMATION | PARAMETER SET CONFIRMATION | |
| 1 | Normal | A | 2018/12/17 01:00:00 | O | O | |
| 2 | Normal | A | 2018/12/17 01:03:30 | O | O | |
| 3 | Deactivated | B | 2018/12/13 02:30:00 | O | O | |
| 4 | Unreachable | B | 2018/12/12 01:08:00 | O | O | |
| 5 | Normal | C | 2018/12/17 00:55:30 | O | O | 2302 |

CONFIRMATION

[SENSOR DEVICE ID = 1] ROUTINE TABLE LIST  2411

[SENSOR DEVICE ID = 1] UPDATE RESULT ☒

| PROCESSING ID | UPDATE CONTENTS | SUCCESS/FAILURE OF UPDATE | FAILURE CAUSES |
|---|---|---|---|
| 2 | CHANGE | SUCCESS | - |
| 3 | DELETION | FAILURE | COMMUNICATION ERROR |
| 7 | ADDITION | FAILURE | INVALID PARAMETER |

| | TRANSMISSION TRIGGER | PARAMETER SET | DELETION |
|---|---|---|---|
| URS | BATCH | 0 | ☐ |
| URS | BATCH | 1 | ☐ |
| URS | BATCH | 2 | ☐ |
| UTES | IMMEDIATE | 1 | ☐ |
| | IMMEDIATE | 0 | ☐ |
| 24 HOURS | - | 1 | ☐ |

ROW ADDITION    UPDATE    PARAMETER SET CONFIRMATION 2501    2412    2414    2415

SENSOR DEVICE, SENSOR DEVICE MANAGEMENT SYSTEM, AND SENSOR DEVICE MANAGEMENT METHOD

CROSS-REFERENCE TO RELATED APPLICATION

The present application claims priority from Japanese application JP2019-034604, filed on Feb. 27, 2019, the contents of which is hereby incorporated by reference into this application.

BACKGROUND OF THE INVENTION

1. Field of the Invention

The present invention relates to a sensor device, a sensor device management system, and a sensor device management method, and more particularly to management of a processing operation performed by the sensor device.

2. Description of Related Art

Studies on the practical application of Internet of Things (IoT) in which a large number of sensor devices are installed in infrastructure and other facilities and measurement data of the sensor devices is collected through a wireless network are in progress. For example, JP-A-2016-163242 discloses a data collection system in which a server collects and analyzes data from a plurality of sensors installed on a monitoring target object, and detects an abnormality of the monitoring target object or a precursor of the abnormality.

Usually, since a large number of sensor devices are installed in the IoT, it is required to reduce manufacturing cost and operation cost per sensor device. For example, the sensor device is driven by a built-in battery, but when the sensor device is installed in a place such as a manhole or a high place where it is difficult for an operator to enter, the battery cannot be easily replaced. Even if the battery can be replaced, when batteries of a large number of sensor devices are replaced, a very large cost is required. Accordingly, in order to extend the battery of the sensor device, it is important that the sensor device has low power consumption.

In order to reduce power consumption of the entire system, for example, JP-A-2010-28168 discloses a wireless communication network system, in which a wireless terminal of the wireless communication network system, which communicates with any of wireless terminals directly or with all other wireless terminals through one or more other wireless terminals by using packetized data, controls an intermittent period, analyzes a transmission and reception state of the wireless terminal for a preset period, and extends or shortens a sleep period based on the analysis result.

As a method for reducing the power consumption of the sensor device, an intermittent operation may be included. In the intermittent operation, a wireless module of the sensor device is powered off during a period other than a period during which the sensor device wirelessly transmits data (active mode), and the sensor device shifts to a sleep mode with low power consumption from the active mode.

When the sensor device always transmits a measurement processing result wirelessly after executing a measurement processing program, if there is a measurement processing program that is frequently executed, the sensor device frequently performs wireless communication, and thus it is difficult to reduce power consumption.

On the other hand, in order to reduce power consumption, regardless of execution frequency of the measurement processing program, for example, if wireless communication frequency is fixedly determined like wireless data transmission once every three days, it takes a long time from the measurement by the sensor device until the management server acquires the measurement processing result, and thus, freshness of the measurement processing result is reduced.

The sensor device executes various processing programs. For example, the sensor device executes a measurement processing program that processing measurement data of a sensor and a transmission processing program that wirelessly transmits a measurement processing result. The sensor device is equipped with a plurality of sensors such as a temperature sensor, a humidity sensor, a vibration sensor, and an earthquake sensor, and may execute a plurality of types of measurement processing programs. The sensor device may execute the plurality of types of measurement processing programs using measurement data of a single sensor.

A freshness requirement for the measurement processing result varies according to the contents of the measurement processing program and how to use the collected measurement processing result. For example, in an application for detecting water leakage in a water pipe using measurement data of a vibration sensor of a sensor device, if an amount of water leakage is small, the need to detect water leakage immediately is low and the freshness requirement is relatively loose. On the other hand, when construction without notification (other construction) is being performed near a place where the water pipe is buried, the water pipe may be damaged if the other construction is continued. Therefore, the application for detecting execution of the other construction has a strict requirement for freshness because it is necessary to grasp the occurrence of the other construction as soon as possible after the occurrence of the other construction.

In this way, the sensor device is required to reduce the frequency of wireless communication and realizes low power consumption while performing wireless communication so as to meet the freshness requirement that varies according to a type of measurement processing, in other words, a requirement for rapid reporting. In JP-A-2016-163242, how to meet different requirements for rapid reporting according to the type of measurement processing in the sensor device is not described.

SUMMARY OF THE INVENTION

An object of the present invention is to suppress the power consumption of a sensor device. Another object of the present invention is to easily perform update processing of information managed by the sensor device.

A sensor device according to a preferred example of the present invention includes one or a plurality of sensors, a memory that stores a program and data, a processor that performs measurement processing by the sensor and transmission processing of sensor data generated by measurement processing by executing the program, and a communication unit that transmits the sensor data, in which the memory includes a buffer for storing the sensor data processed by the processor, and a processing routine table that holds a processing routine configured to include, corresponding to an identifier for identifying processing performed by the processor, a type of the processing, an execution trigger of the processing, and trigger information that prescribes a trigger for transmitting the sensor data, and the processor controls processing in the processing routine of the processing routine table based on the trigger information, so that the sensor data subjected to the measurement processing is immediately transmitted, or temporarily stored in the buffer and transmitted after a predetermined time.

A sensor device management system according to a preferred example of the present invention includes a sensor device and a management server that controls the sensor device and acquires measured sensor data, which are connected via a network, in which the sensor device includes one or a plurality of sensors, a memory that stores a program and data, a processor that performs measurement processing by the sensor and transmission processing of sensor data generated by the measurement processing by executing the program, and a communication unit that transmits the sensor data, the memory includes a buffer for storing the sensor data processed by the processor, and a processing routine table that holds a processing routine configured to include a type of processing performed by the processor, an execution trigger of the processing, and trigger information that prescribes a trigger for transmitting the sensor data, corresponding to an identifier for identifying the processing, and the processor controls processing in the processing routine of the processing routine table based on the trigger information, so that the sensor data subjected to the measurement processing is immediately transmitted, or temporarily stored in the buffer and transmitted after a predetermined time, and the management server receives a measurement processing result from the sensor device, and instructs the sensor device to add, change, or delete a processing routine of the processing routine table.

The present invention is also grasped as a sensor device management method in the sensor device management system.

According to the present invention, sensor data can be flexibly transmitted according to the type of measurement processing, and the power consumption of the sensor device can be reduced. In addition, it is possible to easily perform update processing of information managed by the sensor device.

BRIEF DESCRIPTION OF THE DRAWINGS

FIG. 4 is a diagram illustrating a configuration example of a processing routine table according to the embodiment;

FIG. 17 is a diagram illustrating a configuration example of a routine table update message for acquiring detailed data according to the embodiment;

FIG. 18 is a diagram illustrating a configuration example of the processing routine table after routine table update for acquiring detailed data according to the embodiment.

FIG. 19 is a diagram illustrating a configuration example of the processing routine table including an operation-at-the-time-of-duplication and priority information according to the embodiment;

FIG. 24 is a display example of a routine table confirmation screen according to the embodiment;

FIG. 25 is another display example of the routine table confirmation screen according to the embodiment;

DESCRIPTION OF EMBODIMENTS

Hereinafter, embodiments of the present invention will be described in detail with reference to the accompanying drawings.

Figure 1:
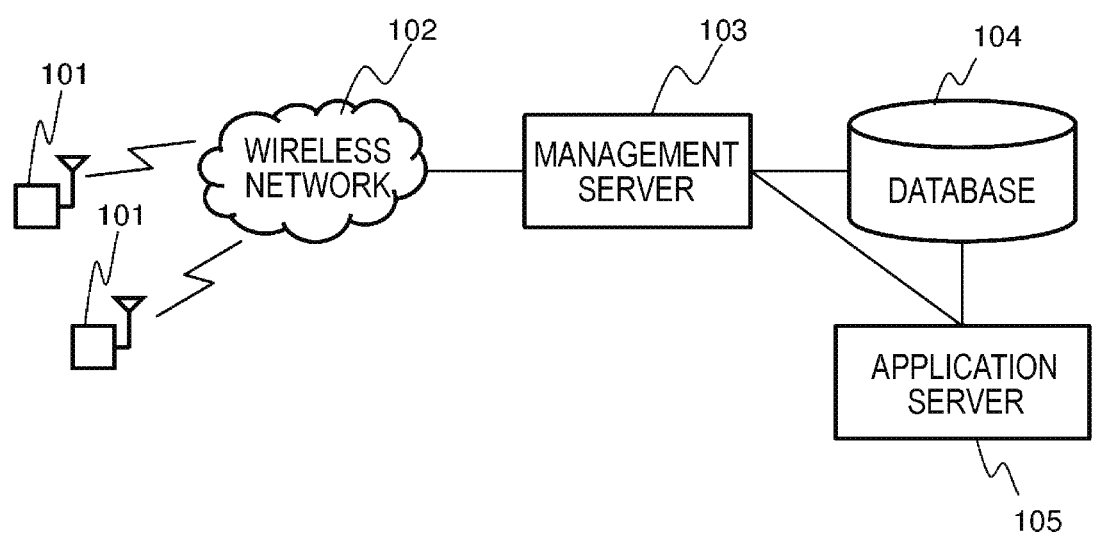
FIG. 1 is a diagram illustrating a configuration of a sensor device management system according to an embodiment.

FIG. 1 is a diagram illustrating a configuration of a sensor device management system according to an embodiment.

The sensor device management system is configured to include a plurality of sensor devices 101, a wireless network 102, a management server 103, a database 104, and an application server 105. The sensor device 101 is connected to the management server 103 via the wireless network 102. The wireless network 102 is a low power wide area (LPWA) network or a cellular communication network, and is usually constituted with a wireless base station, a network server, and the like.

The sensor device 101 is a measuring instrument that measures temperature, humidity, vibration, and the like, and measurement data and information (hereinafter collectively referred to as a measurement processing result or sensor data) created based on the measurement data are transmitted to the management server 103 via the wireless network 102. The information created based on measurement data refers to information that has been subjected to data processing, such as measurement data compression processing or data format conversion. The management server 103 stores the received measurement processing result in the database 104. The database 104 is a computer installed on the network, and stores the measurement processing result and management information related to the sensor device 101. The application server 105 acquires the measurement processing result and management information related to the sensor device 101 from the database 104, and performs analysis and display of the analysis result.

Figure 2:
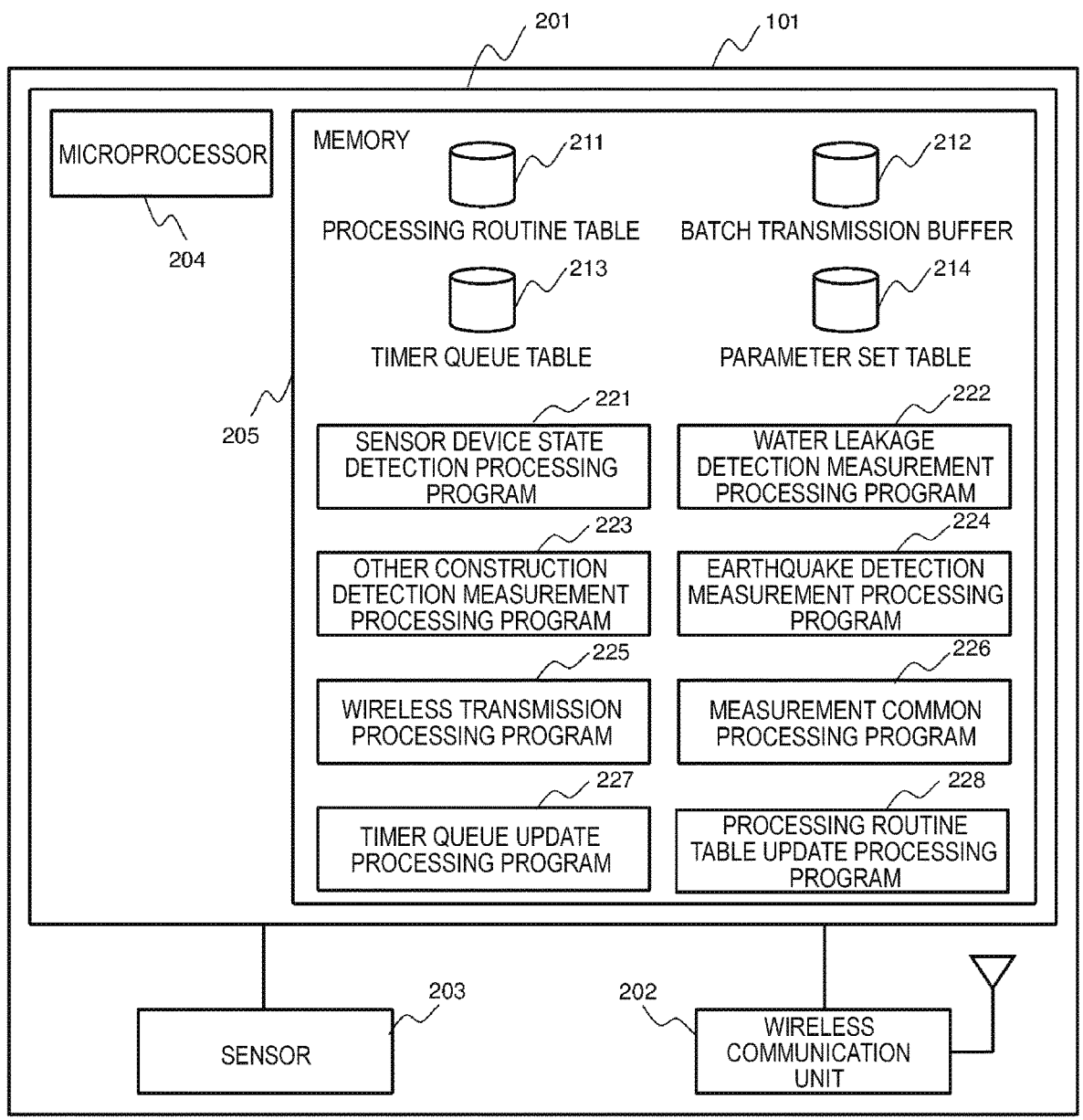
FIG. 2 is a diagram illustrating a configuration of a sensor device according to the embodiment.

FIG. 2 is a diagram illustrating a configuration of the sensor device 101.

The sensor device 101 is configured to include a control unit 201, a wireless communication unit 202, and a sensor 203, and is driven by a battery. The illustration of the battery (power supply) is omitted.

The control unit 201 includes a microprocessor 204 and a memory 205. The microprocessor 204 executes a program and performs measurement control of the sensor 203, measurement processing for processing measurement data of the sensor 203, an instruction of measurement processing result transmission to the wireless communication unit 202, processing of information received from the wireless communication unit 202, and the like. The memory 205 stores a processing routine table 211, a batch transmission buffer 212, a timer queue table 213, a parameter set table 214, a sensor device state detection processing program 221 for detecting and monitoring a state of the sensor device, a water leakage detection measurement processing program 222, other construction detection measurement processing program 223 to detect that the other construction is being performed, an earthquake detection measurement processing program 224, a wireless transmission processing program 225, a measurement common processing program 226, a timer queue update processing program 227, and a processing routine table update processing program 228. The configuration of these tables and the processing operation of the program will be described later. The wireless communication unit 202 performs wireless transmission and reception with the wireless network 102. The sensor 203 is a detector that measures a physical change of a target such as temperature, humidity, and vibration, and the sensor device 101 includes one or a plurality of types of sensors 203. In this embodiment, a humidity sensor that detects water leakage and a vibration sensor that detects vibration are used as sensors. For example, the vibration sensor can detect ground vibration due to an earthquake or other construction, and the other construction detection measurement processing program 223 and the earthquake detection measurement processing program 224 detect and measure the other construction or an earthquake based on amplitude and cycle of vibration measured by the vibration sensor.

Figure 3:
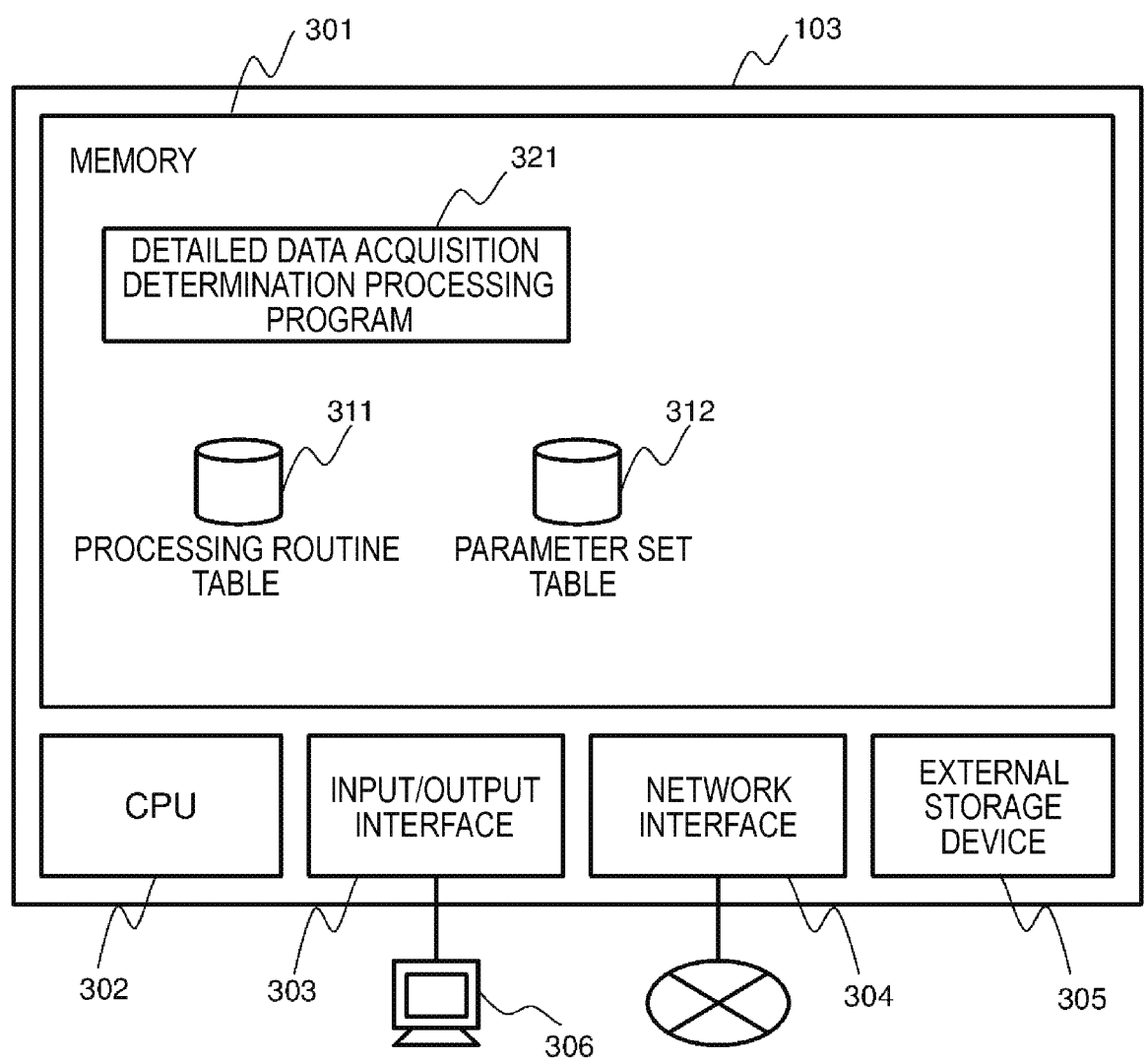
FIG. 3 is a diagram illustrating a configuration of a management server according to the embodiment.

FIG. 3 is a diagram illustrating a configuration of the management server 103.

The management server 103 is configured to include a memory (storage unit) 301, a processor (processing device) 302, an input/output interface 303 for connecting an input/output device 306, a network interface 304, and an external storage device 305. Each function of the management server 103 is realized by a program stored in the external storage device 305 by being loaded in the memory 301 and executed by the processor 302. The management server 103 communicates with the sensor device 101 via the wireless network 102 by the network interface 304. The management server 103 is connected to the database 104 and the application server 105 via the network interface 304.

The memory 301 stores a processing routine table 311, a parameter set table 312, and a detailed data acquisition determination processing program 321. The processing routine table 311 and the parameter set table 312 are stored for managing the processing routine table 211 and the parameter set table 214 of the sensor device. The configuration of these tables and the processing operation of the program will be described later.

In later operation description (for example, FIG. 11 and subsequent drawings), although an expression such as "processing or instruction of the management server 103" appears, the expression means processing performed by the processor (processing device) 302 included in the management server 103 executing a program, and is described as "processing of the management server" for convenience of explanation.

Next, with reference to FIG. 4 and subsequent drawings, a procedure for the sensor device to perform measurement processing based on the processing routine table and transmission processing for wirelessly transmitting the measurement processing result will be described.

FIG. 4 is an example of the processing routine table 211 stored by the sensor device 101. The processing routine table is written in advance in the sensor device at the time of shipment or the like. The contents of the processing routine table 211 may be updated by an instruction from the management server 103. This contents update will be described later.

Each row of the processing routine table 211 corresponds to one processing routine. Each processing routine includes items of a processing ID, Enable, processing type, execution trigger, execution time, execution cycle, transmission trigger, and parameter set ID. The processing ID is an identifier for specifying a processing routine in the sensor device 101. The Enable indicates whether or not the sensor device should execute the processing. In this example, the Enable indicates Enabled (execution target) or Disabled (non-execution target). The processing type indicates a type of processing performed by the sensor device. In the illustrated example, there are types such as sensor device state detection processing (simply indicated as state), water leakage detection processing (indicated as water leakage), other construction detection measurement processing (indicated as other construction), earthquake detection measurement processing (indicated as earthquake), and batch transmission processing (indicated as batch transmission). The sensor device state detection processing is, for example, processing of checking a remaining battery level of the sensor device or checking the state of the sensor 203.

The execution trigger indicates the time (also referred to as timing) when the sensor device starts executing the processing, and in this example, either time or event is selected. The execution start of processing at an event trigger is to start processing at the occurrence of an event, instead of at a predetermined timing. For example, the processing is the processing of starting the earthquake detection measurement processing when a sensor (vibration sensor) of the sensor device detects vibration exceeding a certain magnitude. The execution time and the execution cycle indicate the execution start time of the processing and the time period of execution in the processing whose execution trigger is time. The transmission trigger indicates the time when the measurement processing result is transmitted. In this example, either immediate transmission or batch transmission after the measurement processing is selected. The batch transmission is processing in which the sensor device 101 stores the measurement processing results in the buffer 212 and transmits the measurement processing results separately based on the batch transmission processing (processing having processing ID of No. 6) defined on the processing routine table. The parameter set ID is identification information of a parameter set used by the sensor device in the processing.

Next, the parameter set and parameter set ID will be described with reference to FIG. 5.

Figure 5:
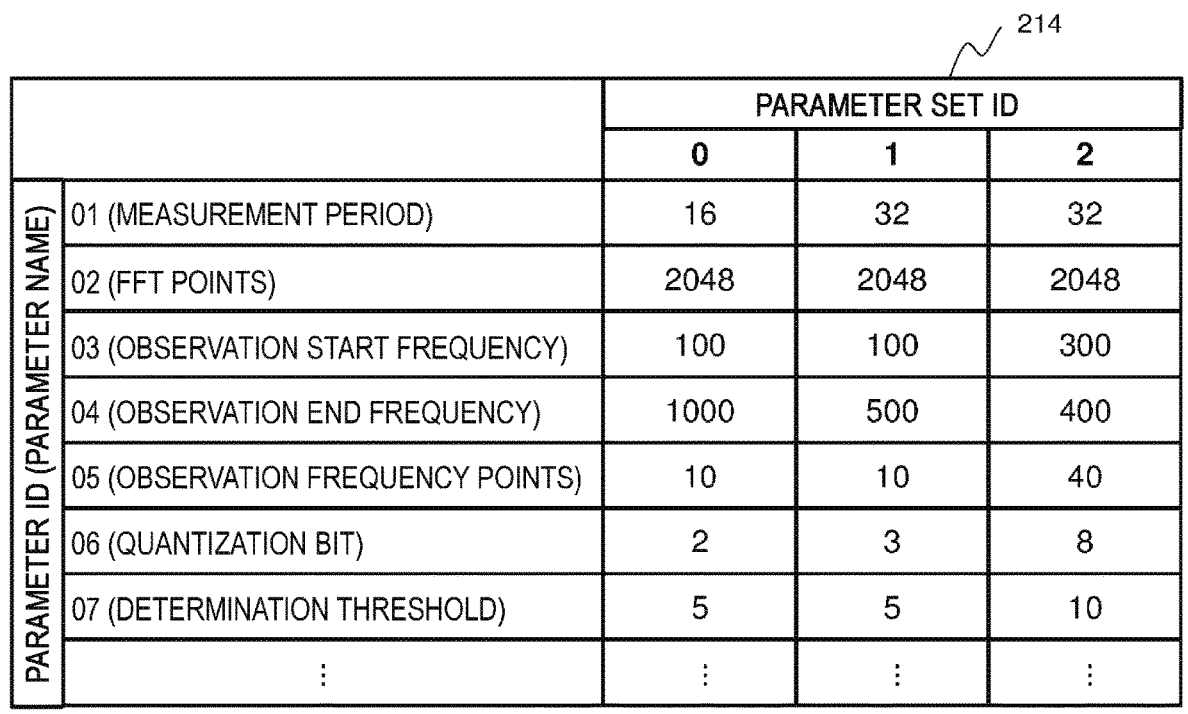
FIG. 5 is a diagram illustrating a configuration example of a parameter set table according to the embodiment.

FIG. 5 illustrates an example of the parameter set table 214 stored by the sensor device 101 related to the water leakage detection measurement processing. The sensor device 101 stores a parameter set table for each processing type described above. That is, the parameter set ID is unique within the same processing type of the same sensor device.

The parameter set table 214 has a combination of a plurality of values for each parameter such as a measurement period and FFT points (sampling number). A combination of values for each parameter is referred to as a parameter set. In the example of FIG. 5, the parameter set table 214 has three parameter sets with parameter set IDs=0, 1, and 2. It is desirable that the sensor device has at least one parameter set at the time of starting the operation of the sensor device. For example, when the sensor device 101 is shipped, the parameter set ID=0 and a value of each parameter corresponding thereto may be written in the parameter set table 214 as a default parameter set.

In order to save power, the sensor device 101 causes the microprocessor 204 to sleep except when processing is performed. The sensor device 101 executes processing with a processing execution trigger defined in the processing routine table 211. That is, if the execution trigger is time, the sensor device 101 performs processing at a predetermined timing determined from the execution time and the execution cycle, and if the execution trigger is an event, the sensor device 101 performs processing when a predetermined event occurs, such as when the sensor detects a vibration exceeding a certain magnitude.

The sensor device 101 manages the next execution start timing in the timer queue table 213 for the processing whose execution trigger is time.

Figure 6A:
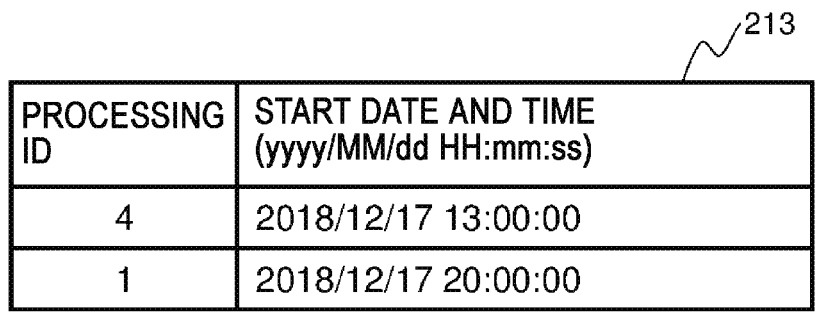
FIGS. 6A-6C are diagrams illustrating a configuration example of a timer queue table according to the embodiment.
Figure 6B:
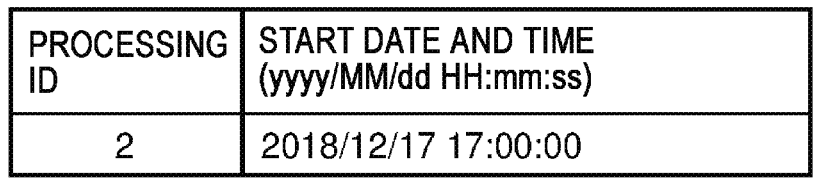
Figure 6C:
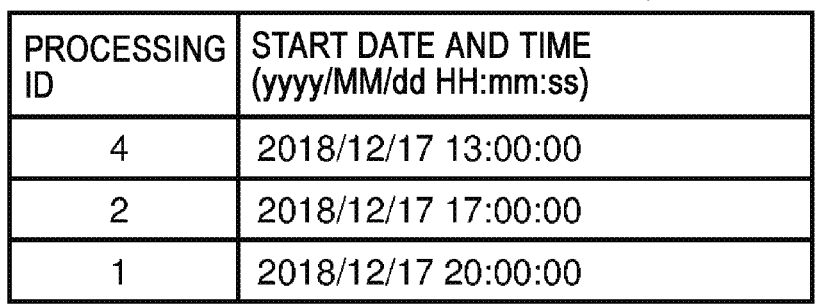

FIGS. 6A-6C illustrate an example of the timer queue table 213 stored by the sensor device 101. The timer queue table 213 includes information on each processing ID and the next execution start date and time, and has these pieces of information in order of early execution start timing. When the execution start date and time of the timer queue table 213 is reached, or when an event that triggers the execution of the processing occurs, the sensor device 101 executes the processing. Here, among processing on the processing routine table 211, the processing related to wireless transmission (processing ID=6 in the example of FIG. 4) is referred to as transmission processing, and the other processing (processing ID=1 to 5 in the example of FIG. 4) is referred to as measurement processing.

Next, measurement processing performed by the sensor device 101 will be described with reference to FIG. 7.

Figure 7:
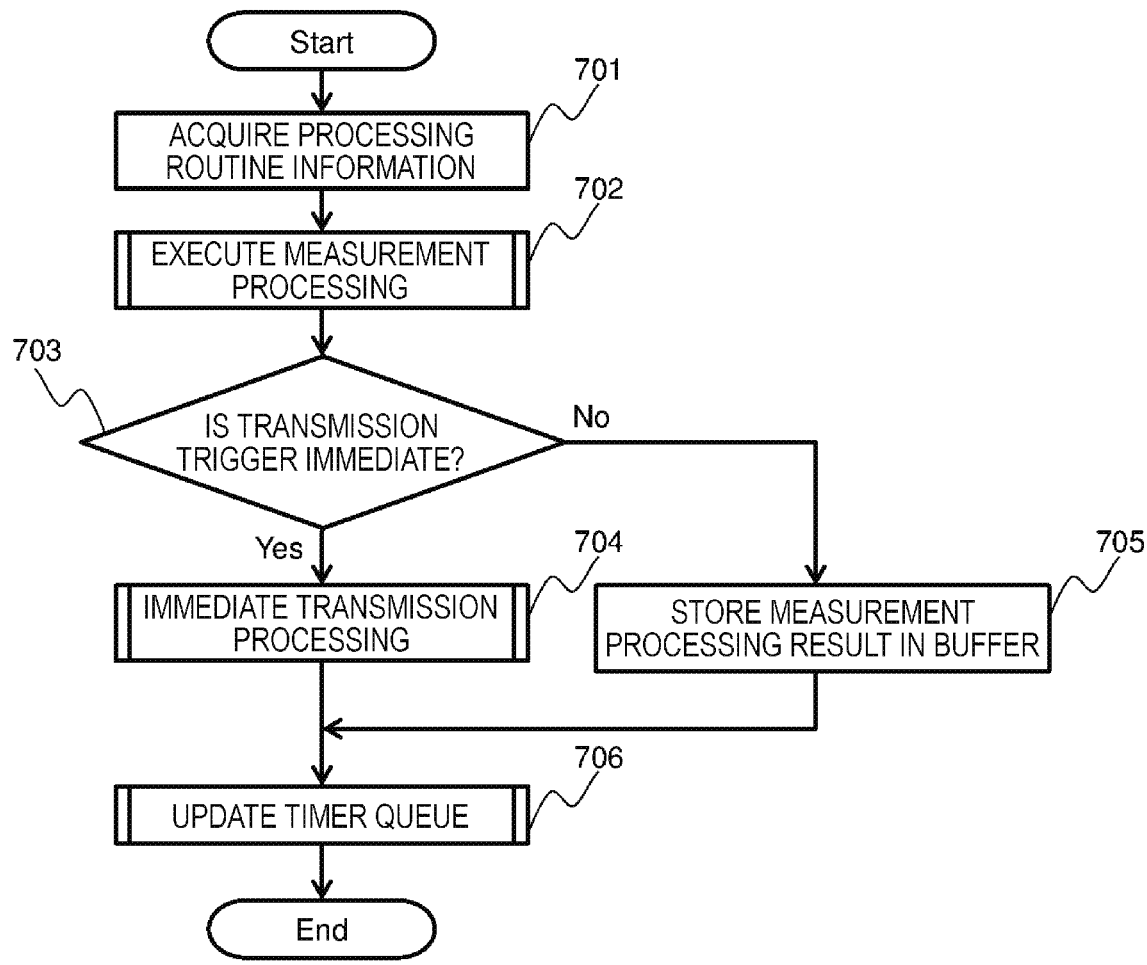
FIG. 7 is a flowchart of measurement common processing according to the embodiment.

FIG. 7 is a diagram for describing a procedure of the measurement processing common between the measurement processing types. This measurement processing is performed by the microprocessor 204 of the sensor device 101 executing the measurement common processing program 226.

The microprocessor 204 acquires processing routine information corresponding to the processing ID (701) and performs measurement processing according to the processing type (702). For example, when the processing type is a water leakage detection measurement processing (water leakage), the microprocessor 204 executes the water leakage detection measurement processing program 222. The water leakage detection measurement processing program 222 processes vibration data measured by the sensor by performing conversion to a frequency domain by FFT, filtering, sampling, quantization, and the like on the vibration data, and outputs the measurement processing result. When the processing type corresponding to the processing ID is state, other construction, earthquake, or batch transmission, the programs 221, 223, 224, and 225 corresponding to the processing are executed.

After the execution of the processing 702 corresponding to the processing type, it is determined whether the transmission trigger corresponding to the processing ID is immediate (703). When it is determined that the transmission trigger is immediate (Yes in 703), the microprocessor 204 performs immediate transmission processing (704). The transmission processing will be described later with reference to FIG. 10. The immediate transmission processing may be performed immediately or after a fixed period of time has elapsed. The fixed period is a time that is considerably shorter than the time when the transmission trigger is batch. Regarding immediate transmission, it is preferable to set a different period for each sensor device 101 and to perform immediate transmission processing after that period. In this way, the wireless transmission timing can be made different between sensor devices, and collision of wireless packets can be avoided, and thus an increase in power consumption due to re-transmission of wireless packets can be prevented. When it is determined that the transmission trigger corresponding to the processing ID is batch (No in 703), the microprocessor 204 stores the measurement processing result in the batch transmission buffer 212 (705). Thereafter, the microprocessor 204 updates the timer queue (706).

Next, a timer queue update procedure will be described with reference to FIGS. 8 and 6.

Figure 8:
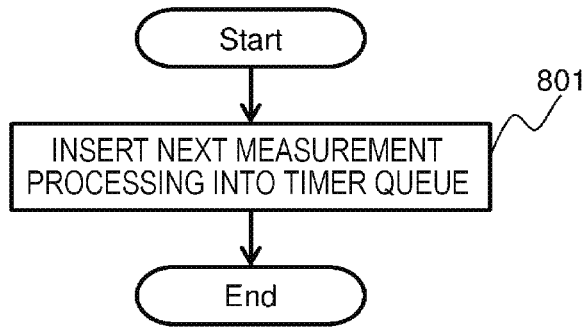
FIG. 8 is a flowchart of timer queue update processing according to the embodiment.

FIG. 8 is a diagram illustrating a procedure of timer queue update processing. The timer queue update is performed by the microprocessor 204 of the sensor device 101 executing the timer queue update processing program. 227. In FIG. 8, the microprocessor 204 calculates the next measurement processing execution timing for the measurement processing based on the processing routine information, and inserts the next measurement processing execution timing into the timer queue (801).

The insertion of the next measurement processing execution timing into the timer queue of FIG. 8 (801) will be specifically described with reference to FIGS. 6A-6C. FIG.

6A illustrates a timer queue before the update, and it is assumed that the microprocessor 204 updates the timer queue for the processing ID=2. The microprocessor 204 calculates the next measurement processing execution timing based on processing routine information. It is assumed that the next measurement processing execution timing for the processing ID=2 is calculated as illustrated in FIG. 6B. The microprocessor 204 inserts and updates the information illustrated in FIG. 6B in the timer queue so that the execution start timing is in order of early execution start timing. As a result, the updated timer queue is as illustrated in FIG. 6C.

In the measurement common processing of FIG. 7, it is determined whether the measurement processing result is transmitted immediately or in a batch, based on whether the transmission trigger in the processing routine table 211 is immediate or batch. The sensor device 101 may determine, based on the measurement processing result, whether the measurement processing result is transmitted immediately or in a batch.

Figure 9:
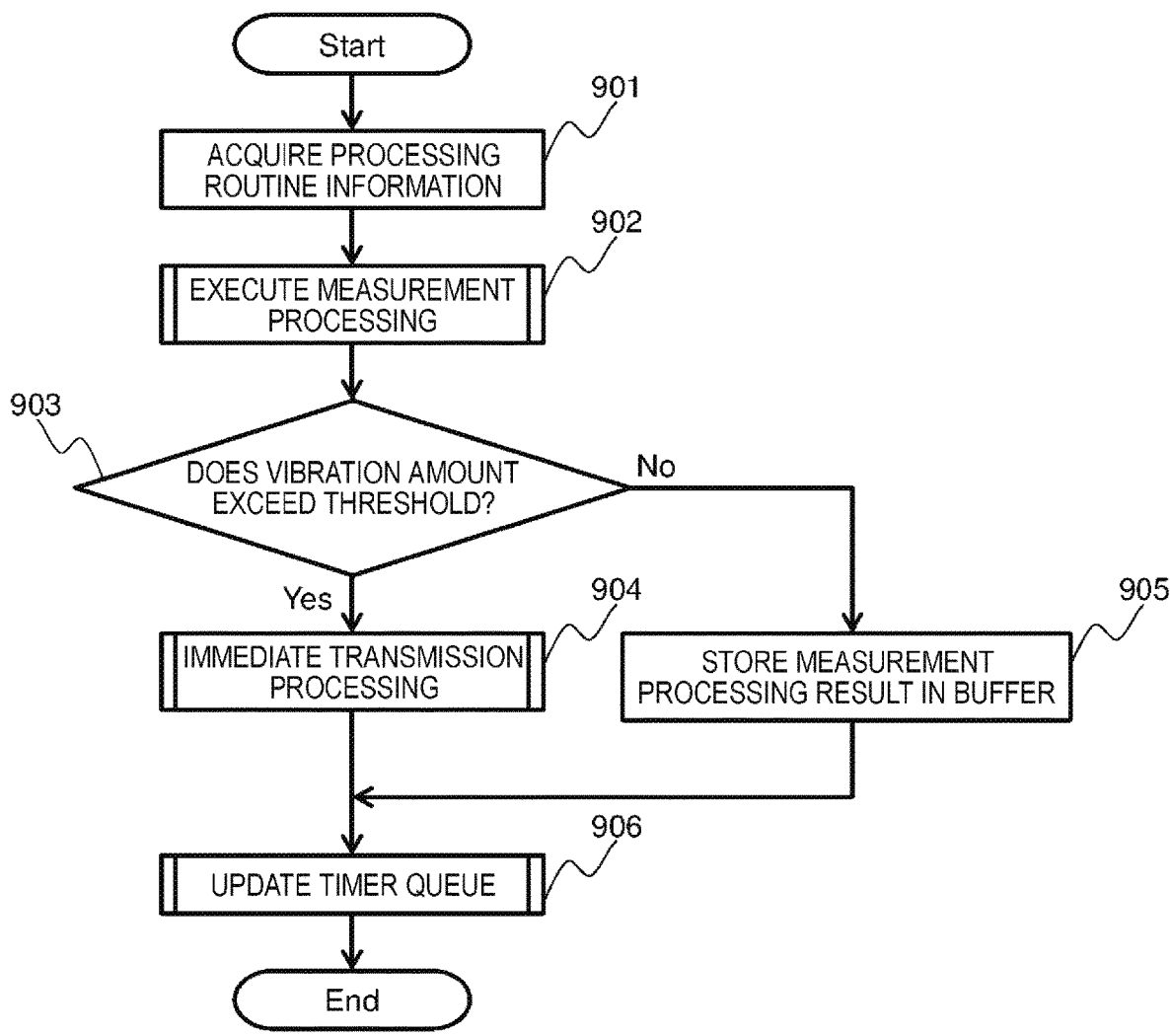
FIG. 9 is a flowchart of measurement common processing in which the sensor device according to the embodiment determines a transmission timing.

Next, with reference to FIG. 9, the measurement common processing when the sensor device 101 determines whether to transmit the measurement processing result immediately or in a batch will be described. FIG. 9 is a diagram for illustrating a procedure of the measurement common processing. In the following description, a water leakage detection measurement processing is taken as an example.

Steps 901 and 902 in FIG. 9 are the same as steps 701 and 702 in FIG. 7, and thus the descriptions thereof are omitted. The microprocessor 204 determines whether or not a vibration amount exceeds a threshold based on the measurement processing result (903). When it is determined that the vibration amount exceeds the threshold (Yes in 903), the microprocessor 204 performs an immediate transmission processing (904). This is because when the vibration amount exceeds the threshold, there is a possibility that water leakage has occurred in a water pipe, and thus the sensor device 101 promptly reports to the management server 103 by immediate transmission. With this configuration, it is possible to take an action such as instructing the sensor device so that the management server 103 acquires detailed information or instructing the operator to investigate the state of the sensor device. On the other hand, when it is determined that the vibration amount does not exceed the threshold (No in 903), the microprocessor 204 stores the measurement processing result in the batch transmission buffer 212 (905). This is because when the vibration amount does not exceed the threshold, the possibility that water leakage has occurred in the water pipe is low, and the necessity of promptly reporting the measurement processing result to the management server is low. In this case, it is possible to suppress wireless transmission frequency by performing batch transmission. Thereafter, the microprocessor 204 updates the timer queue (906).

In this way, the sensor device 101 determines whether to transmit the measurement processing result immediately or in a batch based on the measurement processing result, thereby enabling the management server to collect highly urgent information in a timely manner, and transmitting information with low urgency in a batch transmission to reduce wireless transmission frequency of the sensor device and achieve power saving.

Figure 10:
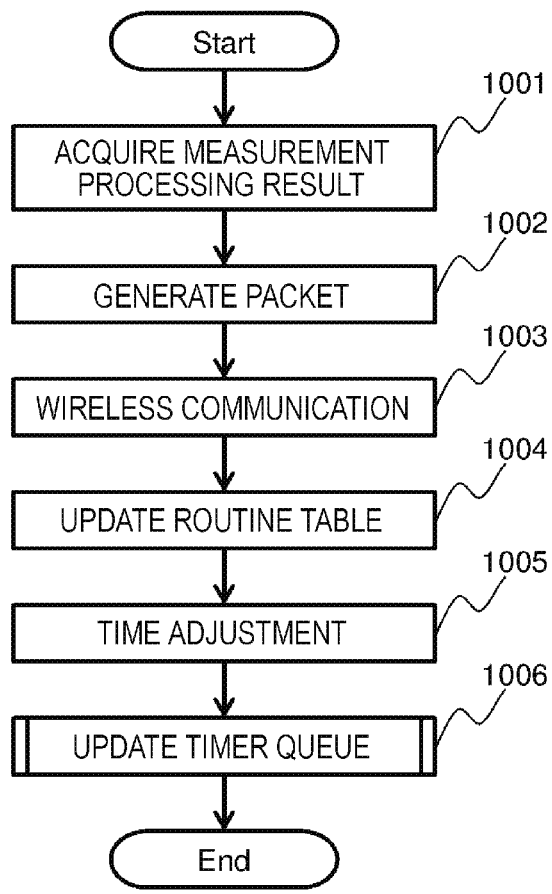
FIG. 10 is a flowchart of wireless transmission processing according to the embodiment.

Next, the wireless transmission processing in the sensor device 101 will be described with reference to FIG. 10. FIG. is a diagram for illustrating the procedure of the measurement processing common between the measurement processing types. The wireless transmission processing is executed when immediate transmission in step 704 of FIG. 7 or step 904 of FIG. 9 is performed and when batch transmission defined by the processing routine table 211 is performed. This processing is performed by the microprocessor 204 of the sensor device 101 executing the wireless transmission processing program 225.

First, the microprocessor 204 acquires a measurement processing result to be transmitted (1001). The measurement processing result to be transmitted is the processing result of the measurement processing in the case of immediate transmission, and the measurement processing result stored in the batch transmission buffer 212 in the case of batch transmission. The microprocessor 204 generates a packet for wireless transmission using the measurement processing result (1002). The microprocessor 204 passes the generated packet to the wireless communication unit 202 and instructs wireless communication (1003). The wireless communication unit 202 transmits the packet. When the packet is received from the management server 103, the wireless communication unit 202 passes the received packet to the microprocessor 204. When there is a received packet and the received packet includes a routine table update message, the microprocessor 204 updates the processing routine table 211 (1004). A processing routine table update method will be described later. When the received packet includes time information, the microprocessor 204 adjusts the time and corrects the time of the sensor device 101 (1005). In the case of batch transmission, the microprocessor 204 updates the timer queue and inserts the next batch transmission processing into the timer queue (1006). The timer queue update method is as described with reference to FIG. 8.

As described above, the sensor device 101 performs immediate transmission of the measurement processing result or performs batch transmission after storing the measurement processing result in the buffer based on the processing routine table 211 including the measurement processing and the wireless transmission processing, thereby reducing the frequency of wireless communication and realizing low power consumption while performing wireless communication so as to meet different freshness requirements according to the type of measurement processing.

In the description described above, the processing routine table 211 is written in the sensor device in advance at the time of shipment or the like. Furthermore, the contents of the processing routine table can be updated by an instruction from the management server 103. A procedure for updating the processing routine table according to an instruction from the management server 103 will be described with reference to FIGS. 11 to 18. The update of the processing routine table refers to the addition, change, or deletion of a processing routine, or addition or change of a parameter set.

The management server 103 stores the processing routine table 311 for each sensor device, and holds the parameter set table 312 for each sensor device and for each processing type. In the management server 103, the same processing routine table and the parameter set table as those written at the time of shipment of the sensor device are registered as the processing routine table 311 and the parameter set table 312 in the initial state. Each time the sensor device processing routine table or parameter set table is updated, the processing routine table and parameter set table related to the sensor device stored by the management server 103 are also updated so that the same contents are stored between the sensor device 101 and the management server 103.

Figure 11:
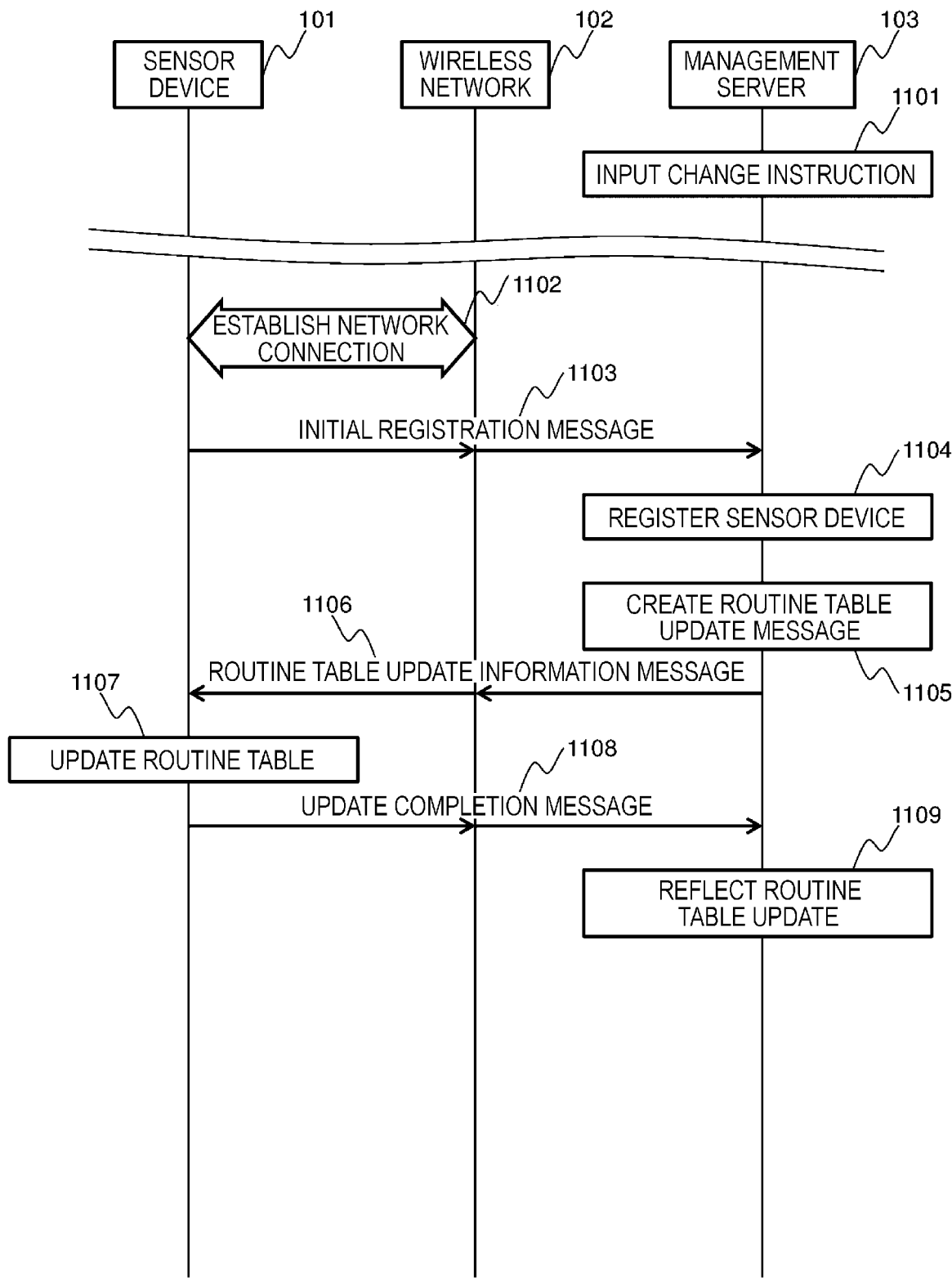
FIG. 11 is a diagram illustrating an operation sequence in the routine table update according to the embodiment.

FIG. 11 is a diagram illustrating a procedure for updating the processing routine table 211 and the parameter set table 214 at the time of the initial connection of the sensor device.

The operator inputs routine table update information into the management server 103 in advance through the input/output device 306 (1101). Here, the routine table update information refers to information for performing addition, change, or deletion of a processing routine or addition or change of a parameter set.

When the sensor device 101 is installed, the sensor device 101 is connected to the wireless network (1102). Thereafter, the sensor device 101 transmits an initial registration message to the management server 103 (1103). The management server 103 registers information of the sensor device 101 in the memory 301 or the external storage device 305 based on the received initial registration message (1104). The management server 103 creates a routine table update information message based on the routine table update information input in step 1101 (1105), and transmits the routine table update information message to the sensor device 101 (1106). The sensor device 101 updates the processing routine table 211 based on the received routine table update information message (1107). The configuration of the routine table update message and the processing routine table update method will be described later. Thereafter, the sensor device 101 transmits an update completion message indicating that the update of the processing routine table is completed to the management server 103 (1108). The management server 103 that has received the update completion message reflects the update contents in the processing routine table 311 and the parameter set table 312 stored by the management server 103 (1109).

Figure 12:
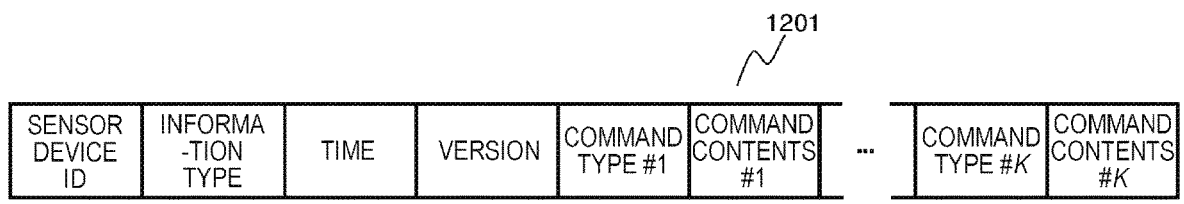
FIG. 12 is a diagram illustrating a configuration example of a routine table update message according to the embodiment.

FIG. 12 is a diagram illustrating a configuration of the routine table update message.

The routine table update message 1201 includes a sensor device ID that is an identifier of a sensor device that is a destination, an information type indicating that this message is a routine table update message, time information, a version indicating the newness of the routine table update message, and one or more commands. Each command includes a command type and command contents. The command type indicates the type of command contents, and is any one of routine processing addition/change, routine processing deletion, and parameter set addition/change. The command contents differ according to the command type.

Here, the command contents will be described with reference to FIGS. 13A-13C.

Figure 13A:
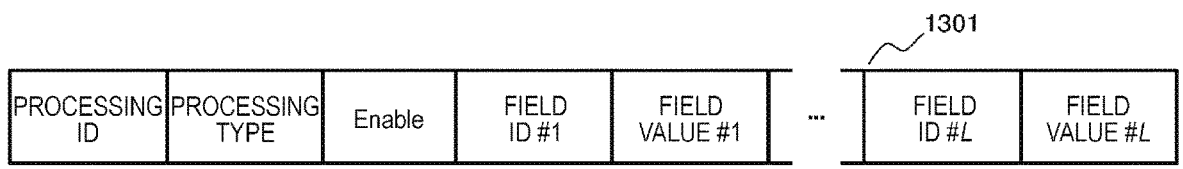
FIGS. 13A-13C are diagrams illustrating a configuration example of a processing routine addition and change command, a processing routine deletion command, and a parameter set addition and change command according to the embodiment.

FIG. 13A illustrates the configuration of command contents when the command type is the routine processing addition/change. In FIG. 13A, the command contents include each item of processing ID, processing type, and Enable, a field ID indicating which item of the processing routine is to be changed, and a field value indicating change contents. The processing type and Enable are included in the command contents for redundancy, but are not necessarily to be included in the command contents. In one command contents, one or more field IDs and field values are included, and at least the field ID and field value of the field to be changed are included. When the processing ID of the command contents related to the routine processing addition/change received by the sensor device 101 is included in the processing routine table that the sensor device 101 already has, the sensor device 101 changes the processing routine of the corresponding processing ID according to the command contents. When the processing ID of the command content related to the routine processing addition/change received by the sensor device 101 is not included in the processing routine table that the sensor device 101 already has, the sensor device 101 adds the processing routine according to the command contents.

Figure 13B:
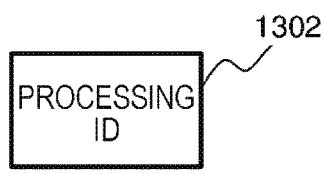

FIG. 13B illustrates the configuration of the command contents when the command type is routine processing deletion. In FIG. 13B, the command contents are configured to include a processing ID. When the sensor device 101 receives the command contents indicating the routine processing deletion, the sensor device 101 deletes the processing routine having the corresponding processing ID.

Figure 13C:
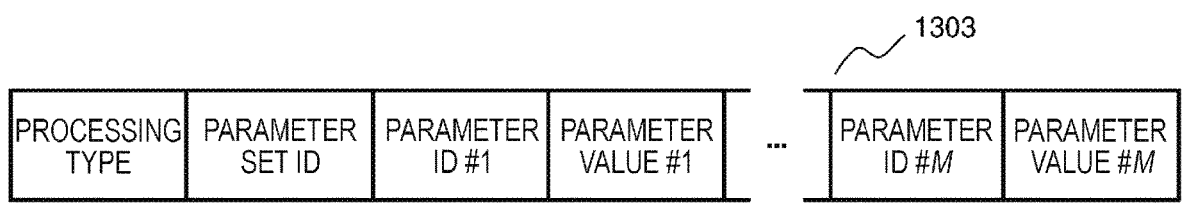

FIG. 13C illustrates the configuration of the command contents when the command type is parameter set addition/change. In FIG. 13C, the command contents include a processing type targeted for addition/change of parameter set, a parameter set ID in the processing type, a parameter ID indicating which parameter of the parameter set is to be changed, and a parameter value indicating the value after the change. In one command content, one or more parameter IDs and parameter values are included, and at least the parameter ID and parameter value of the parameter to be changed are included. When a combination of the processing type and the parameter set ID of the command contents related to the parameter set addition/change received by the sensor device 101 is included in the parameter set table that the sensor device 101 already has, the sensor device 101 changes the parameters of the corresponding processing type and parameter set ID according to the command contents. When the combination of the processing type and parameter set ID of the command contents related to parameter set addition/change received by the sensor device 101 is not included in the parameter set table that the sensor device 101 already has, the sensor device 101 adds a parameter set according to the command contents. In the addition of the parameter set, the parameter ID value not included in the command contents may be the same value as the same parameter ID value in the default parameter set (parameter set ID=0 in FIG. 5).

As described in FIGS. 13A-13C, by including information on fields and parameters to be changed in the command contents and omitting information on fields and parameters not to be changed from the command contents, the amount of wireless communication can be reduced, traffic congestion can be prevented, and sensor device power can be saved.

In FIG. 11, although the procedure for updating the processing routine table 211 at the time of the initial connection of the sensor device is described, the processing routine table 211 may be updated during the operation of the sensor device after the initial connection. Next, a procedure for updating the processing routine table 211 during the operation of the sensor device will be described with reference to FIG. 14.

Figure 14:
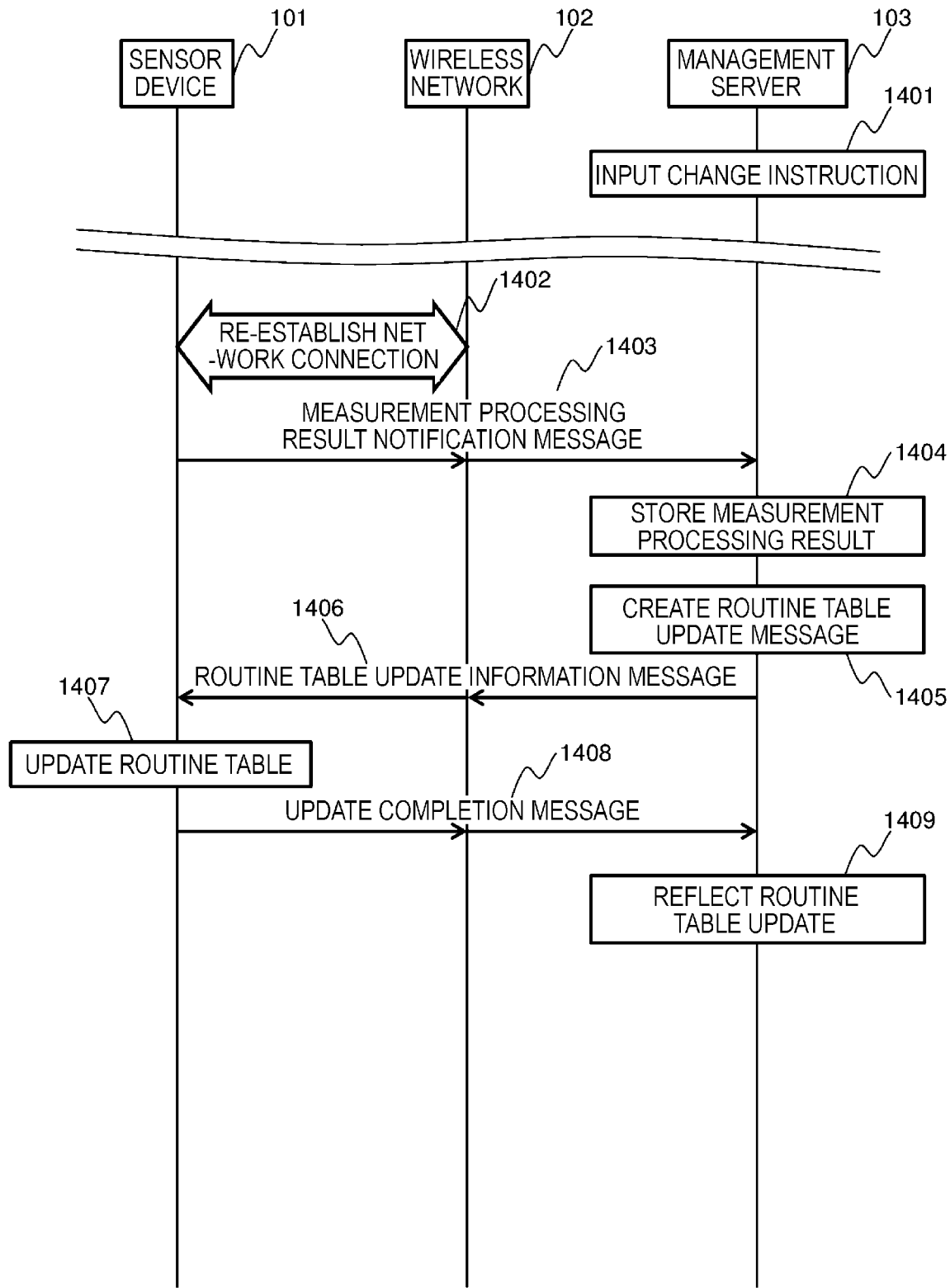
FIG. 14 is a diagram illustrating an operation sequence in the routine table update according to the embodiment.

FIG. 14 is a diagram for describing the procedure for updating the processing routine table 211 during the operation of the sensor device. The operator inputs routine table update information (information for performing addition, change, or deletion of a processing routine or addition or change of a parameter set) to the management server 103 through the input/output device 306 (1401). When the sensor device 101 wirelessly transmits the measurement processing result, the sensor device 101 reconnects to the wireless network (1402). Thereafter, the sensor device 101 transmits the measurement processing result to the management server 103 (1403). The management server 103 stores the received measurement processing result in the database 104 (1404). The management server 103 creates a routine table update information message based on the routine table update information (1405) and transmits the routine table update information message to the sensor device 101 (1406). Hereinafter, steps 1407 to 1409 in FIG. 14 are the same as steps 1107 to 1109 in FIG. 11, and thus the descriptions thereof are omitted.

As described above, even when the sensor device is in operation, it is possible to update the processing routine table and flexibly perform processing performed by the sensor device and addition or change of parameters used for the processing.

In the examples illustrated in FIGS. 11 and 14, the operator inputs the routine table update information into the management server 103 through the input/output device 306. However, as another example, the management server 103 may determine the routine table update based on the measurement processing result. Next, a routine table update procedure when the management server 103 determines to update a routine table based on the measurement processing result will be described with reference to FIGS. 15 to 18.

Figure 15:
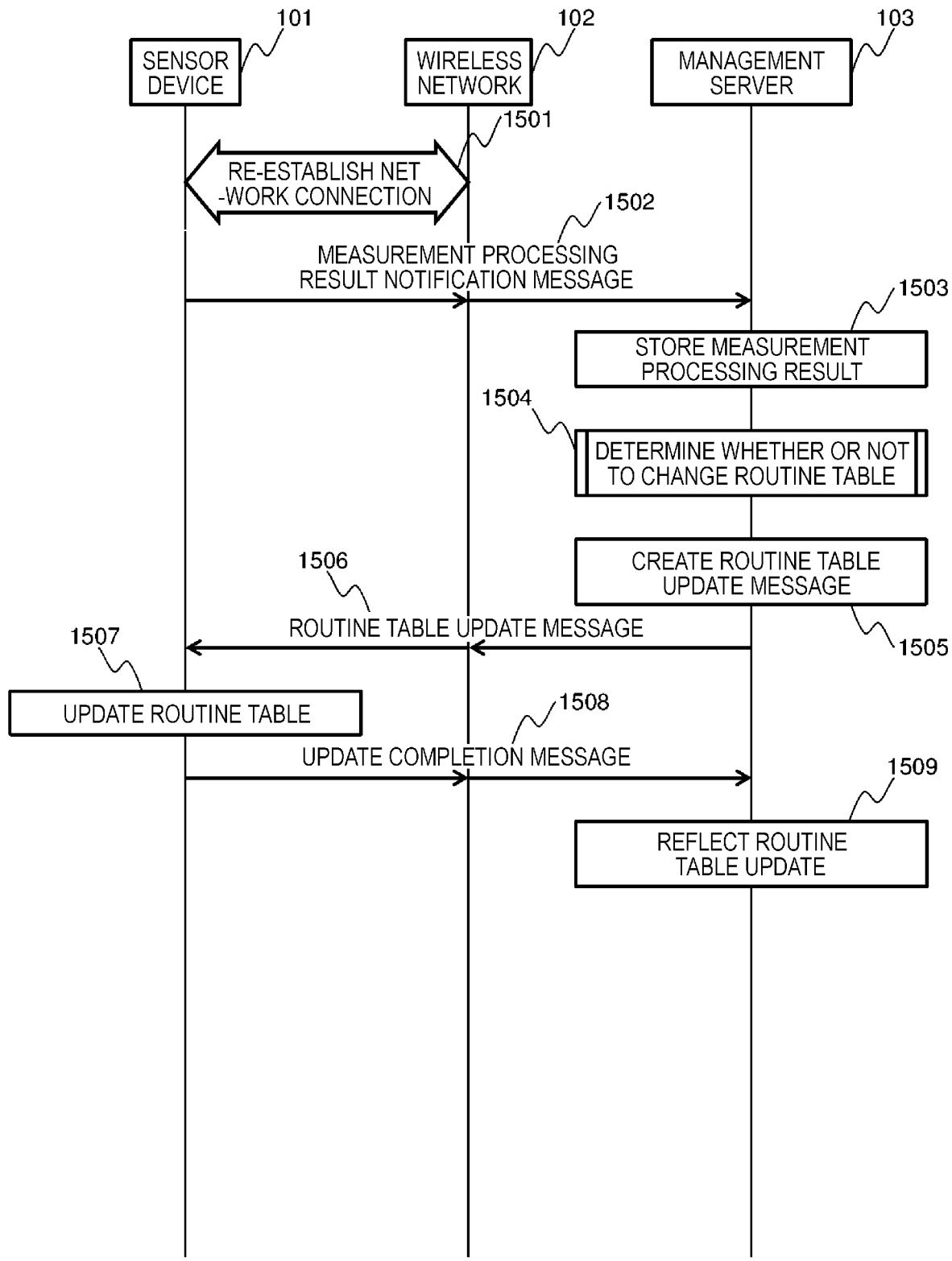
FIG. 15 is a diagram illustrating another operation sequence in the routine table update according to the embodiment.

FIG. 15 is a diagram for illustrating the routine table update procedure when the management server 103 determines to update the routine table update based on the measurement processing result. Steps 1501 to 1503 in FIG. 15 are the same as steps 1402 to 1404 in FIG. 14, and thus the descriptions thereof are omitted. The management server 103 performs a routine table update determination processing for determining whether or not to update the routine table and determining update contents, based on the received measurement processing result (1504).

Figure 16:
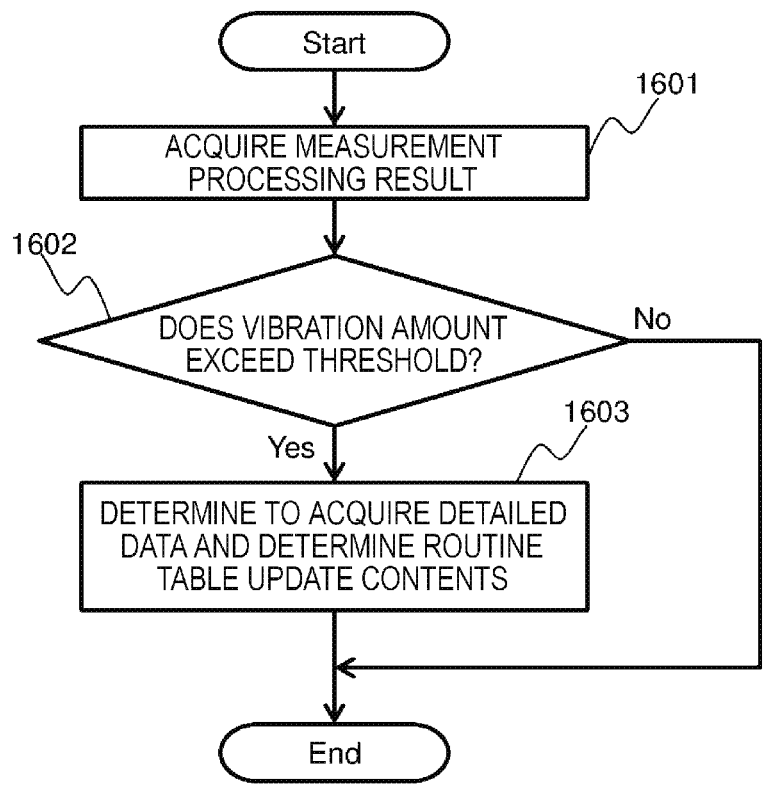
FIG. 16 is a flowchart of detailed data acquisition determination processing according to the embodiment.

Here, the routine table update determination processing in step 1504 will be described with reference to FIG. 16. FIG. 16 is a diagram for illustrating a procedure of routine table update determination processing regarding water leakage detection. This routine table update determination processing is performed by the processor 302 of the management server 103 executing the detailed data acquisition determination processing program 226.

In FIG. 16, the processor 302 acquires the measurement processing result of water leakage detection (1601), and determines whether or not the vibration amount included in the measurement processing result exceeds the threshold (1602). When it is determined that the vibration amount exceeds the threshold (Yes in 1602), the processor 302 determines to acquire detailed data and determines the routine table update contents for the detailed data acquisition (1603). This is because when the vibration amount exceeds the threshold, there is a possibility that water leakage has occurred in the water pipe, and thus detailed data is collected and analyzed to determine the occurrence of water leakage and to specify the amount and position of water leakage.

Referring back to FIG. 15, the management server 103 creates the routine table update information message based on the routine table update contents determined in 1504 (1505), and transmits the routine table update information message to the sensor device 101 (1506). Steps 1507 to 1509 in FIG. 15 are the same as steps 1107 to 1109 in FIG. 11, and thus the descriptions thereof are omitted.

The routine table update based on the management server determination described with reference to FIG. 15 will be specifically described with reference to FIGS. 17 and 18.

First, it is assumed that the processing routine table 211 of the sensor device before the update is the same as that in FIG. 4, and the parameter set related to the water leakage detection measurement processing is the same as that in FIG. 5. In FIG. 4, the processing routine whose processing type is water leakage corresponds to a processing ID=2 and a processing ID=3, and the processing ID=2 corresponds to Enabled (execution target) and the processing ID=3 corresponds to Disabled (non-execution target). The processing routine with the processing ID=2 uses a parameter set ID=1, and the processing routine with the processing ID=3 uses a parameter set ID=2. In FIG. 5, compared to the parameter set ID=1, the parameter set ID=2 measures vibration spectrum in a specific narrow frequency band, and has a larger number of samples and a larger number of quantization bits, and thus the parameter set ID=2 is a parameter set suitable for acquiring more detailed data. Accordingly, in this example, if the processing ID=2 is changed to Disabled (non-execution target) and the processing ID=3 is changed to Enable (execution target), detailed data can be acquired.

In FIG. 17, the routine table update contents described above are reflected in the configuration of the routine table update message described with reference to FIGS. 12 and 13. In FIG. 17, the command type is the addition/change of routine. The routine table update message of FIG. 17 includes, as the command contents, changing the Enable field to Disabled (non-execution target) for the processing ID=2 (processing type=water leakage) and changing the Enable field to Enabled (execution target) for the processing ID=3 (processing type=water leakage).

When the sensor device 101 reflects the contents of the routine table update message in FIG. 17 on the processing routine table in FIG. 4, the processing routine table becomes an updated processing routine table as illustrated in FIG. 18. In the updated processing routine table, the Enable field with processing ID=2 is changed to Disabled (non-execution target), and the Enable field with processing ID=3 is changed to Enabled (execution target).

As described above, if the processing routine for acquiring the detailed data is also registered in the processing routine table 211 in advance, the packet size for the management server 103 to instruct the sensor device 101 to acquire the detailed data can be reduced.

By the way, as one way to reduce the manufacturing cost of the sensor device, an inexpensive microprocessor may be used. When the inexpensive microprocessor is used, there are cases where a plurality of processing cannot be performed in parallel due to limitations on processing capability. In such a case, when the execution start timing of processing is reached, or when an event that triggers the execution of processing occurs, if the microprocessor is already executing another processing, the new processing cannot be executed (hereinafter referred to as processing duplication). However, when the new processing requires urgency like the earthquake detection measurement processing, it is desirable to execute the new processing even if the processing being executed is stopped when the processing is duplicated. Accordingly, when the processing is duplicated, it is determined, according to the type of processing, whether to continue or interrupt the processing being executed, or whether to execute or stop new processing.

Next, with reference to FIGS. 19 to 22, description will be made on a procedure for determining, based on the processing routine table, whether or not to continue the processing being executed and whether or not to execute new processing when processing duplication occurs.

FIG. 19 is an example of the processing routine table 211 stored by the sensor device 101. Each row of the processing routine table 211 in FIG. 19 corresponds to one processing routine. Each processing routine includes, in addition to items of processing ID, Enable, processing type, execution trigger, execution time, execution cycle, transmission trigger, parameter set ID (up to here, items common to those in FIG. 4), items of operation-at-the-time-of-duplication and priority. The operation-at-the-time-of-duplication indicates whether new processing is to be executed after the processing being executed is completed (after-the-end), new processing is canceled and the processing being executed is continued (cancel), or the processing being executed is interrupted and new processing is executed (interrupt), when the processing is duplicated. The priority is a value indicating the priority of processing, and the smaller the value, the higher the priority. Although the processing routine table of FIG. 19 has an item of priority, as another example, a processing ID may be used as the priority without providing the item of priority.

Next, the procedure of the measurement processing based on information of the operation-at-the-time-of-duplication and priority information will be described. First, it is assumed that the processing being executed cannot be interrupted due to the restriction of the microprocessor of the sensor device 101. The procedure of the measurement common processing when the processing being executed cannot be interrupted is the same as that illustrated in FIG. 7, but the processing contents of the timer queue update (706) are different.

Figure 20:
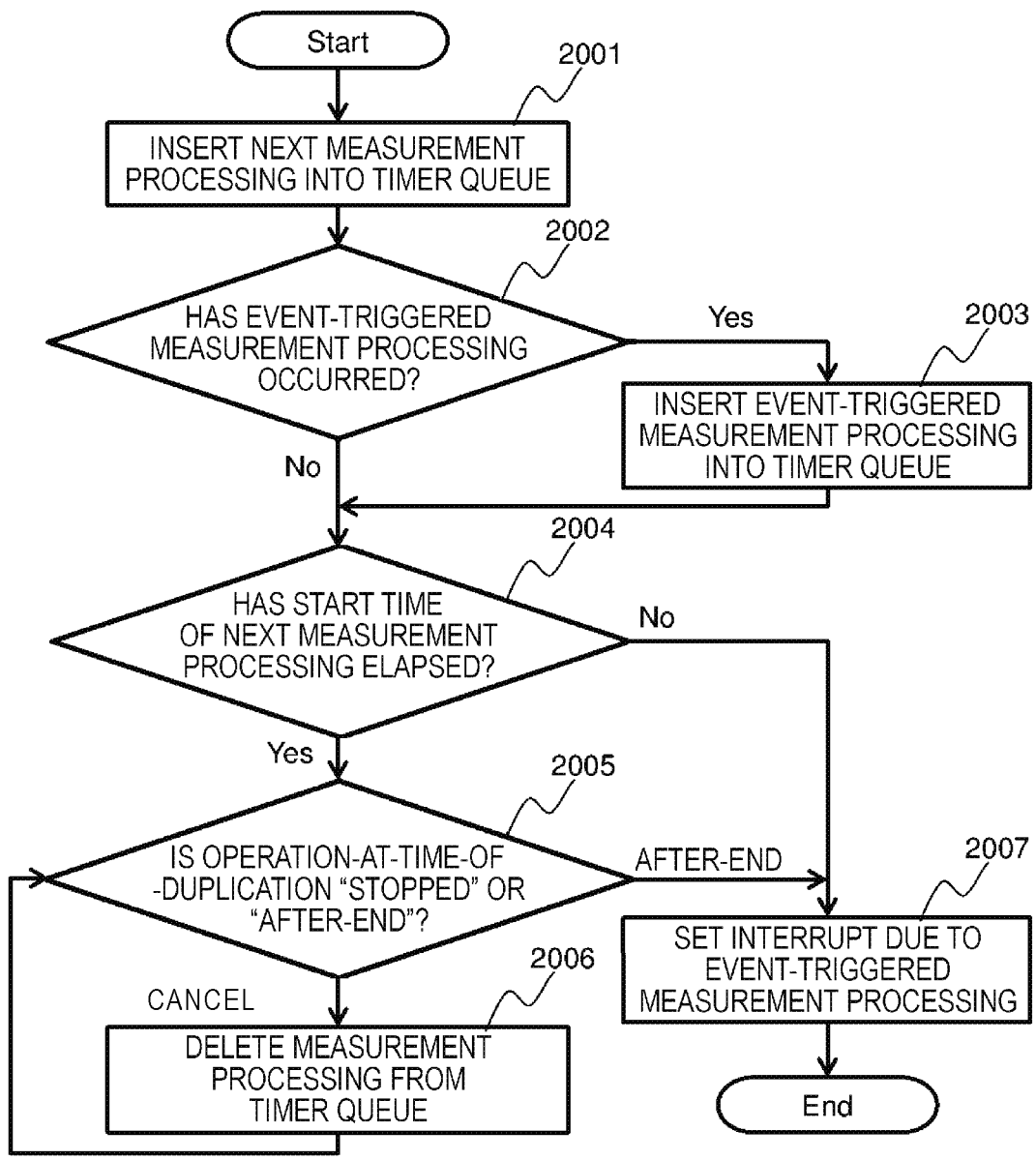
FIG. 20 is a flowchart of timer queue update processing based on the operation-at-the-time-of-duplication and priority information according to the embodiment.

With reference to FIG. 20, a description will be made on a timer queue update procedure when the processing being executed cannot be interrupted in the measurement processing based on the operation-at-the-time-of-duplication and priority information. FIG. 20 is a diagram for illustrating the procedure of the timer queue update processing. The timer queue update is performed by the microprocessor 204 of the sensor device 101 executing the timer queue update processing program 227. For the measurement processing, the microprocessor 204 calculates the next measurement processing execution timing based on the processing routine information and inserts the next measurement processing execution timing into the timer queue (2001). The procedure for inserting into the timer queue is the same as the procedure described in FIGS. 6A to 6C. After that, the microprocessor 204 checks whether the event-triggered measurement processing has occurred (the event that triggers the measurement processing execution has occurred) (2002). When it is confirmed that event-triggered measurement processing has occurred (Yes in 2002), the event-triggered measurement processing is inserted into the timer queue (2003). In order to make this event-triggered measurement processing come to the first row of the timer queue table (meaning that the processing should be executed earliest), the current date and time may be input as the start date and time. The microprocessor 204 refers to the timer queue table 213 and checks whether or not the start time of the next measurement processing has elapsed, except for the event-triggered measurement processing inserted in step 2003 (2004). When the start time of the next measurement processing has not elapsed (No in 2004), the microprocessor 204 performs the event-triggered measurement processing inserted in step 2003 (2007).

On the other hand, when the start time of the next measurement processing has elapsed (Yes in 2004), the microprocessor 204 refers to the processing routine table 211 to check whether the operation-at-the-time-of-duplication of the next measurement processing whose start time has elapsed is cancel or after-the-end (2005). When it is checked that the operation-at-the-time-of-duplication of the next measurement processing is cancel, the measurement processing is deleted from the timer queue table 213 (2006), and it is further checked whether the next measurement processing is stopped or after-the-end (2005). When it is checked, in step 2005, that the operation-at-the-time-of-duplication of the next measurement processing is after-the-end, the microprocessor 204 does not delete this measurement processing from the timer queue table 213. After that, the microprocessor 204 executes an event-triggered measurement processing (2007). By steps 2005, 2006, and 2007, among the time-triggered measurement processing for which the start time of the next measurement processing has elapsed, the time-triggered measurement processing, of which the operation-at-the-time-of-duplication is after-the-end on the processing routine table, is left in the timer queue table, and the time-triggered measurement processing can be executed after the event-triggered measurement processing is ended.

Next, the procedure of the measurement processing based on the operation-at-the-time-of-duplication and priority information when the microprocessor 204 of the sensor device 101 can interrupt the processing being executed will be described with reference to FIGS. 21 and 22.

Figure 21:
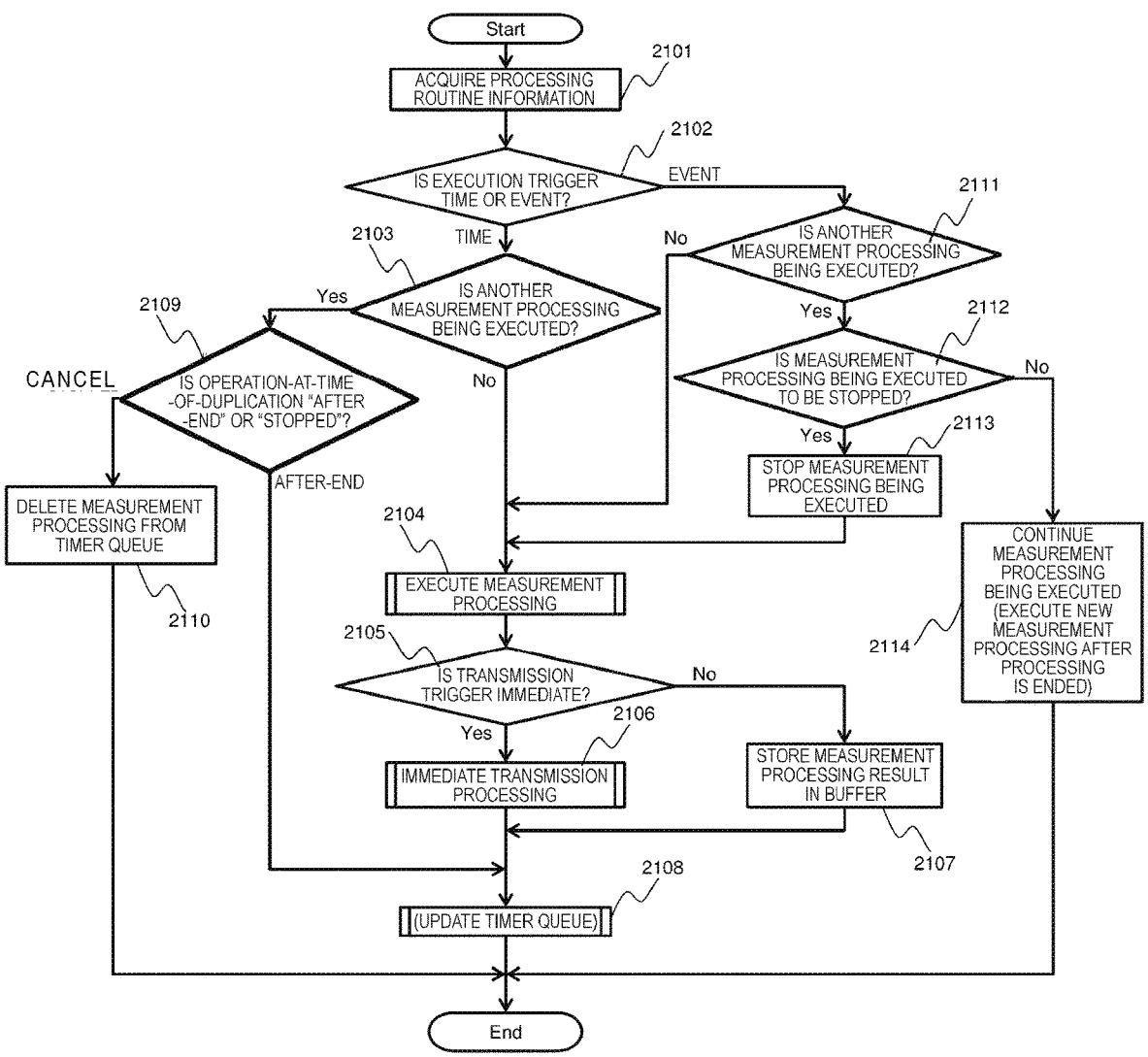
FIG. 21 is a flowchart of measurement common processing based on the operation-at-the-time-of-duplication and priority information according to the embodiment.
Figure 22:
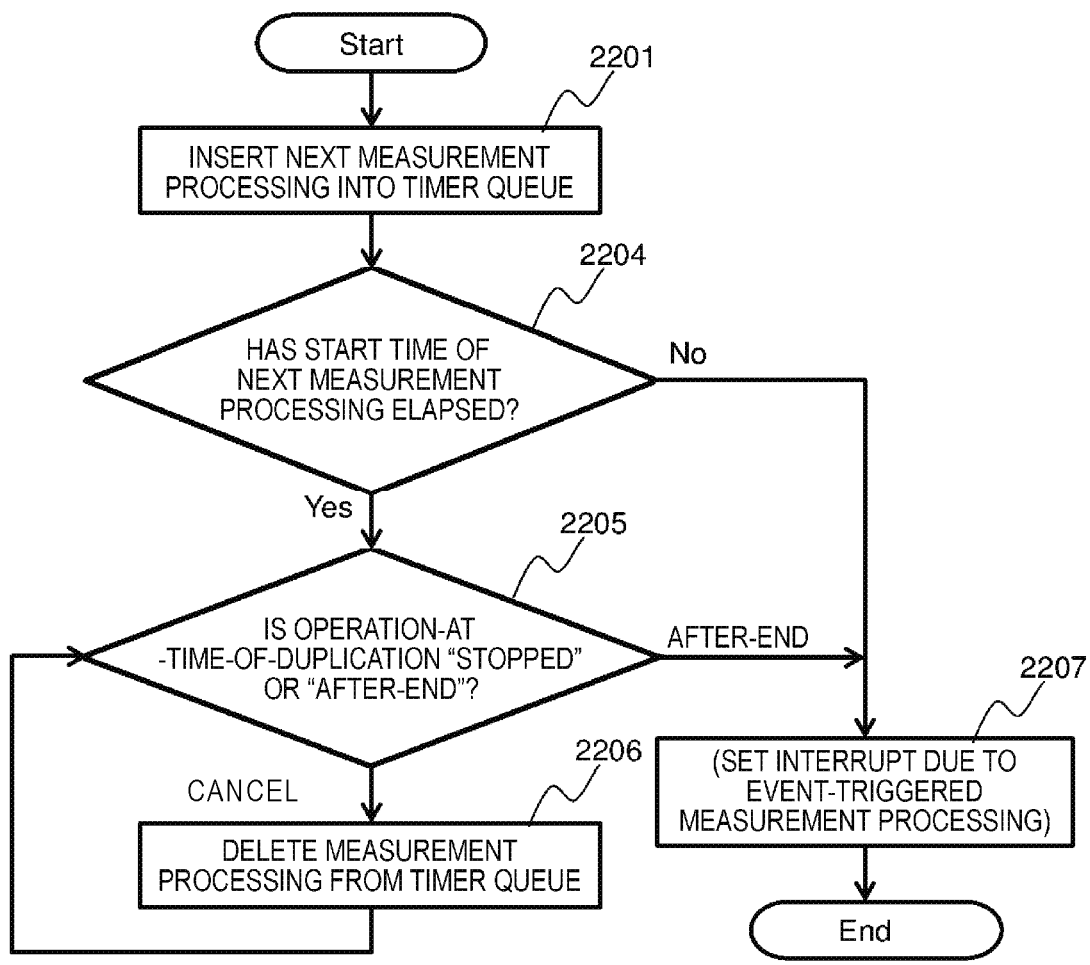
FIG. 22 is a flowchart of the timer queue update processing based on the operation-at-the-time-of-duplication and priority information according to the embodiment.

FIG. 21 is a diagram for illustrating the procedure of the measurement common processing when the processing being executed can be interrupted. This processing is performed by the microprocessor 204 of the sensor device 101 executing the measurement common processing program 226.

In FIG. 21, the microprocessor 204 acquires processing routine information corresponding to the processing ID of new measurement processing (2101). The microprocessor 204 determines whether the execution trigger of the acquired processing routine information is time or event (2102). When it is determined that the execution trigger is time, the microprocessor 204 determines whether there is a measurement processing being executed (2103). When it is determined that there is no measurement processing being executed (No in 2103), the microprocessor 204 performs measurement processing according to the measurement processing type (2104). Then, the microprocessor 204 determines whether the transmission trigger of the measurement processing result is immediate or batch (2105). When it is determined that the transmission trigger corresponding to the processing ID is immediate (Yes in 2105), the microprocessor 204 performs immediate transmission processing (2106). On the other hand, when it is determined that the transmission trigger corresponding to the processing ID is batch (No in 2105), the microprocessor 204 stores the measurement processing result in the batch transmission buffer 212 (2107). Thereafter, the microprocessor 204 updates the timer queue (2108). The timer queue update procedure in step 2108 will be described later with reference to FIG. 22.

When it is determined that there is the measurement processing being executed in step 2103 (Yes in 2103), the microprocessor 204 refers to the processing routine table 211 to determine whether the operation-at-the-time-of-duplication of the new measurement processing is after-the-end or cancel (2109). When it is determined that the operation-at-the-time-of-duplication of the new measurement processing is after-the-end, the microprocessor 204 updates the timer queue in step 2108. On the other hand, when it is determined that the operation-at-the-time-of-duplication of the new measurement processing is cancel, the measurement processing is deleted from the timer queue (2110).

When the execution trigger is an event in step 2102, the microprocessor 204 determines whether there is a measurement processing being executed (2111). When it is determined that there is no measurement processing being executed (No in 2111), the microprocessor 204 executes the event-triggered measurement processing (2104). The subsequent operations from step 2105 to step 2108 are as described above.

When it is determined that there is the measurement processing being executed in step 2111 (Yes in 2111), the microprocessor 204 determines whether or not to stop the measurement processing being executed (2112). When the measurement processing being executed in step 2112 is the time-triggered measurement processing, the microprocessor 204 determines to stop the measurement processing being executed. In step 2112, when the measurement processing being executed is event-triggered measurement processing, the microprocessor 204 refers to the processing routine table 211 and compares the priority of the measurement processing being executed with the priority of the new measurement processing. As a result, it is determined that the measurement processing being executed is stopped when the new measurement processing has a higher priority and the measurement processing being executed is not stopped when the measurement processing being executed has a higher priority. When it is determined to stop the measurement processing being executed (Yes in 2112), the microprocessor 204 stops the measurement processing being executed (2113) and executes the new measurement processing (2104). The subsequent operations from steps 2105 to 2108 are as described above.

When it is determined, in step 2112, that the measurement processing being executed is not to be stopped (No in 2112), the microprocessor 204 continues the measurement processing being executed (2114), and after the measurement processing being executed is ended, the new measurement processing is executed.

Next, the timer queue update procedure in step 2108 will be described with reference to FIG. 22. FIG. 22 is a diagram for illustrating the procedure of the timer queue update processing.

The timer queue update is performed by the microprocessor 204 of the sensor device 101 executing the timer queue update processing program 227. For the measurement processing, the microprocessor 204 calculates the next measurement processing execution timing based on the processing routine information, and inserts the next measurement processing execution timing into the timer queue (2201). The procedure for inserting into the timer queue is as already described. Since the measurement processing being executed in step 2114 in FIG. 21 is continued, when the new event-triggered measurement processing has not yet been executed, the new event-triggered measurement processing is inserted into the timer queue at step 2201. The microprocessor 204 refers to the timer queue table 213 and checks whether the start time of the next measurement processing has elapsed (2204). When the start time of the next measurement processing has not elapsed (No in 2204), if the event-triggered measurement processing is inserted into the timer queue in step 2204, the microprocessor 204 performs the event-triggered measurement processing (2207). When the start time of the next measurement processing has elapsed (Yes in 2204), the microprocessor 204 refers to the processing routine table 211 to check whether the operation-at-the-time-of-duplication of the next measurement processing whose start time has elapsed is cancel or after-the-end (2205). When the operation-at-the-time-of-duplication of the next measurement processing is cancel (Yes in 2205), the measurement processing is deleted from the timer queue table 213 (2206), and it is further checked whether the next measurement processing is stopped or after-the-end (2205). When the operation-at-the-time-of-duplication of the next measurement processing is after-the-end (No in 2205), this measurement processing is not deleted from the timer queue table 213. After that, when the event-triggered measurement processing is inserted into the timer queue in step 2204, the microprocessor 204 executes the event-triggered measurement processing (2207). By steps 2205, 2206, and 2207, among the time-triggered measurement processing for which the start time of the next measurement processing has elapsed, the time-triggered measurement processing, of which the operation-at-the-time-of-duplication is after-the-end on the processing routine table, is left in the timer queue table, and the time-triggered measurement processing can be executed after the event-triggered measurement processing is ended.

In this way, by including information on the operation-at-the-time-of-duplication and priority in the processing routine table 211, when the processing is duplicated, it is possible for the sensor device to refer to the processing routine table and determine whether to continue or interrupt the processing being executed, or whether to execute or stop new processing, according to the type of processing.

Next, the input of routine table update information performed by the operator in step 1101 of FIG. 11 and step 1401 of FIG. 14 will be described with reference to FIGS. 23 to 31. FIGS. 23 to 31 illustrate screen display examples of the input/output device 306 of the management server 103 that are viewed and operated by the operator.

Figure 23:
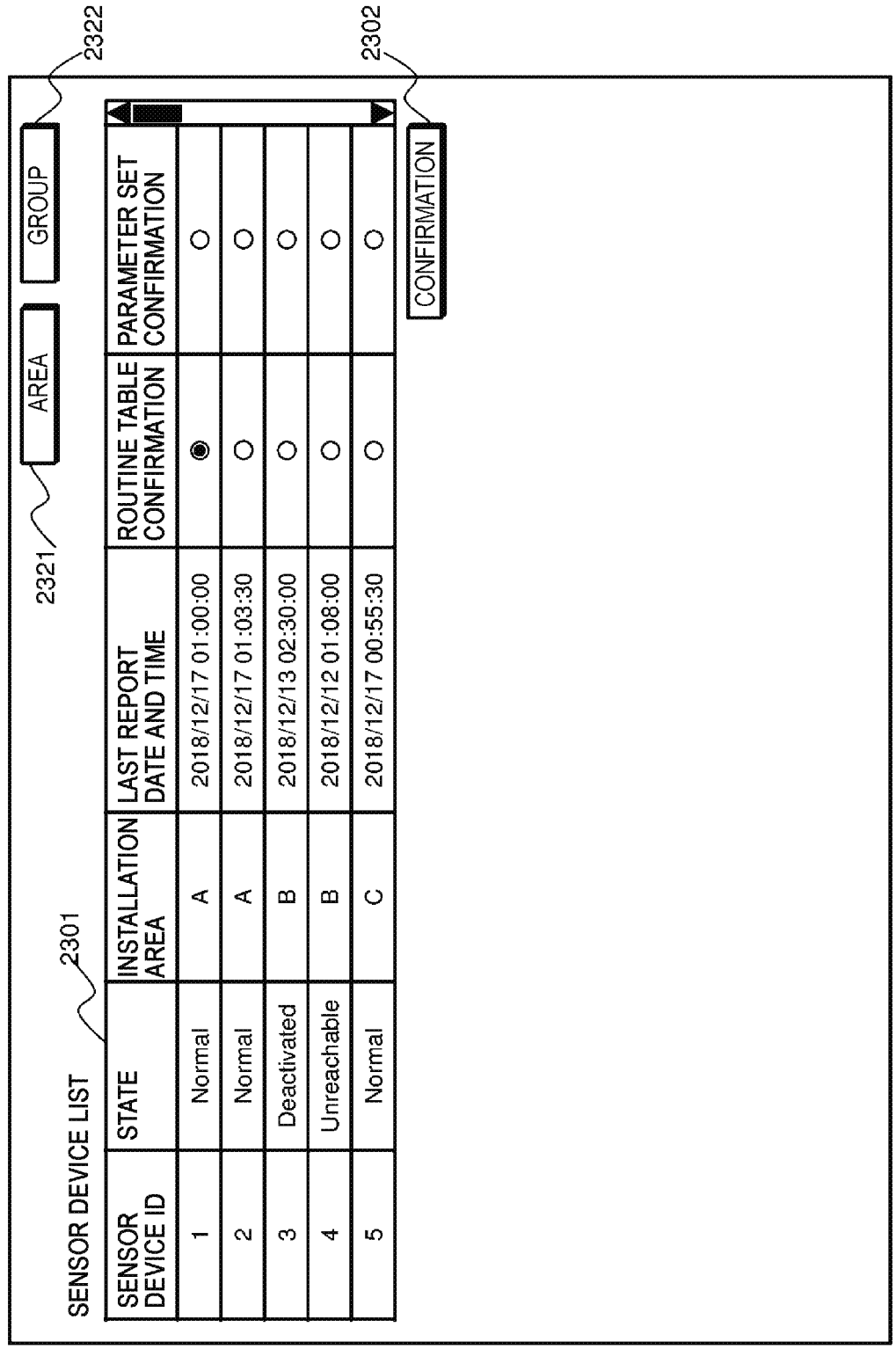
FIG. 23 is a display example of a sensor device list display screen according to the embodiment.

FIG. 23 is a sensor device list display screen. On the sensor device list display screen, a sensor device list 2301 is displayed. In the sensor device list 2301, the sensor device ID of each sensor device, sensor device state, installation area information, last report date and time which is the date and time when the last measurement processing result notification was received are included. When the operator intends to check the processing routine table for a specific sensor device, the operator checks a routine table confirmation field of a target sensor device ID and presses a confirmation button 2302, thereby transitioning to a routine table confirmation screen of FIG. 24. When the operator intends to check the parameter set for a specific sensor device, the operator checks a parameter set confirmation field of the target sensor device ID and presses the confirmation button 2302, thereby transitioning to a parameter set confirmation screen of FIG. 26. When an area button 2321 is pressed, a transition to an area list display screen of FIG. 27 is made. When a group button 2322 is pressed, a transition to a group list display screen of FIG. 29.

FIGS. 24 and 25 are routine table confirmation screens. In the routine table confirmation screen of FIG. 24, a processing routine table 2411 for the sensor device (here, sensor device ID=1) selected on the sensor device list display screen is displayed. In the routine table confirmation screen, processing routines can be added, changed, or deleted during editing of the processing routine table. When it is intended to add a processing routine, a row addition button 2412 is pressed. When the row addition button 2412 is pressed, a new row (processing ID=7) is added.

When an update button 2414 is pressed on the screen of FIG. 24, an update result dialog 2501 is displayed as illustrated in FIG. 25. In the update result dialog 2501, an ID of a processing routine to which an update instruction is issued, update contents (addition, change, or deletion of the processing routine), success/failure of the update, and failure causes in the case of an update failure are displayed. Failure causes include a communication error (for example, time-out without the management server receiving the update completion message 1108), an invalid parameter (designated parameter value is invalid), a sensor device error, and the like. The operator can check the display contents of the update result dialog 2501 and determine completion or retrial of the update work.

Figure 26:
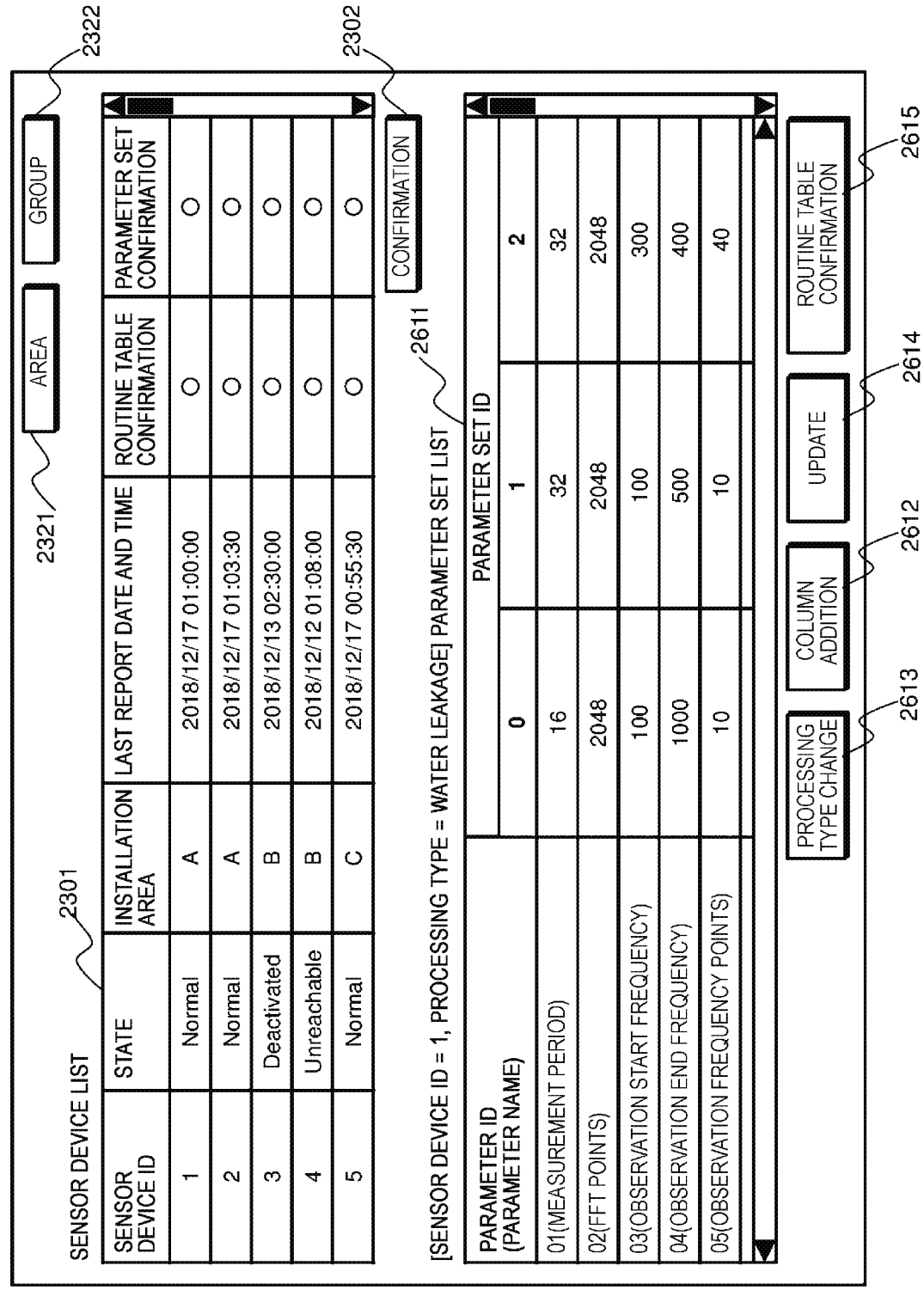
FIG. 26 is a display example of a parameter set confirmation screen according to the embodiment.
Figure 27:
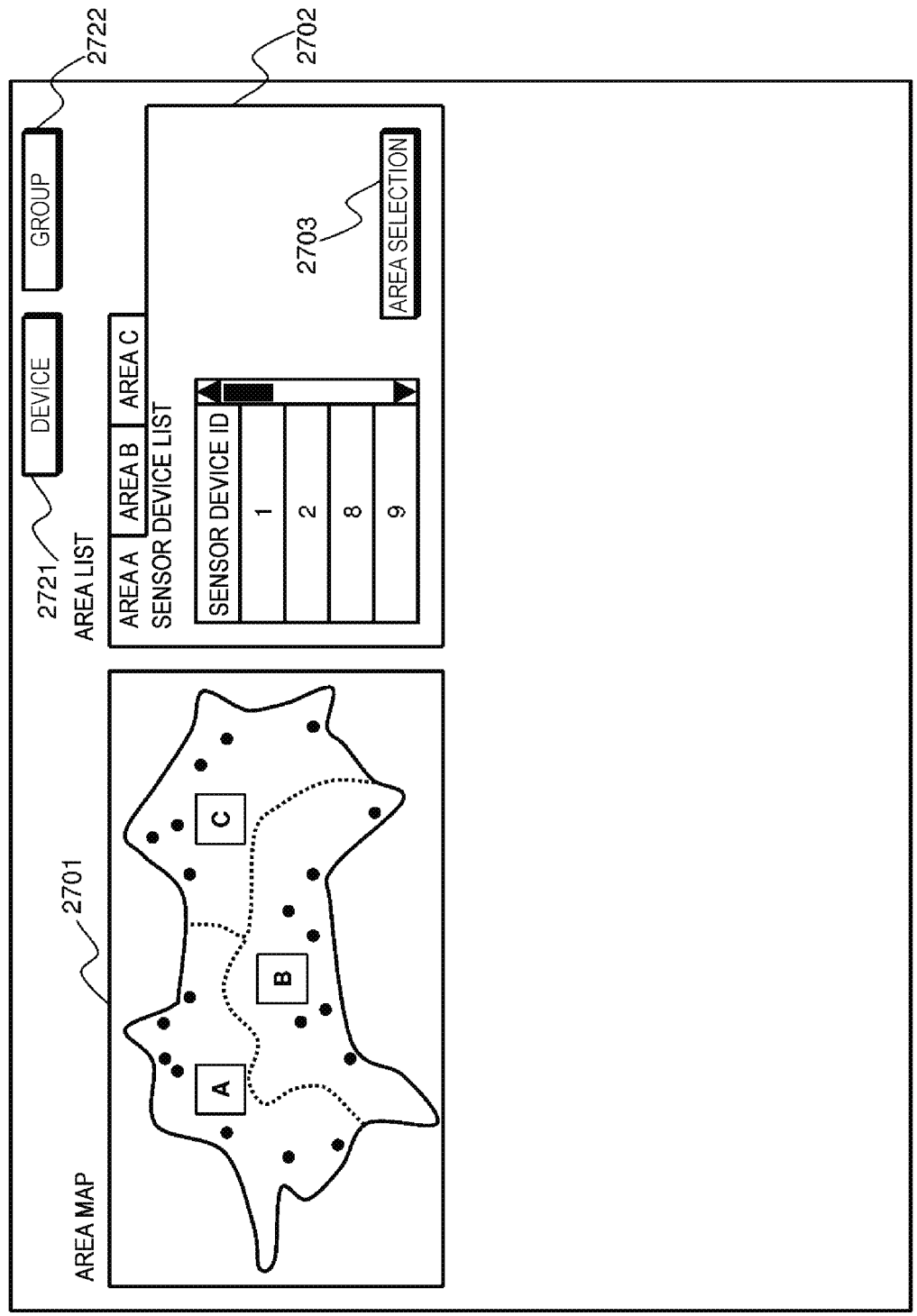
FIG. 27 is a display example of an area list display screen according to the embodiment.

When a parameter set confirmation button 2415 is pressed on the routine table confirmation screen illustrated in FIG. 24, a transition to a parameter set confirmation screen in FIG. 26 is made. As illustrated in FIG. 26, a parameter set 2611 for the sensor device (here, sensor device ID=1) selected on the sensor device list display screen is displayed on the parameter set confirmation screen. On the parameter set confirmation screen, parameter sets can be added or changed during the editing of the routine table. When it is intended to add a parameter set, a column addition button 2612 is pressed. When the column addition button 2612 is pressed, a new column is added to the parameter set 2611. When the operator inputs the parameter value in the added new column and presses an update button 2614, the input of a parameter set addition instruction to the management server 103 is completed. In order to change the parameter set, a parameter value intended to be changed in the parameter set 2611 is edited, and the update button 2614 is pressed. The parameter set is stored for each processing type, and the parameter set displayed in FIG. 26 is for the case where the processing type is water leakage. When it is intended to edit a parameter set of another processing type, if a processing type change button 2613 is pressed, the parameter set of another processing type is displayed. When a routine table confirmation button 2615 is pressed, a transition to the routine table confirmation screen of FIG. 24 is made.

By preparing such operation screens, the operator can easily edit the processing routine table and the parameter set. As a result, the processing contents of the sensor device can be easily edited. In addition, different processing contents can be set for each sensor device.

Figure 28:
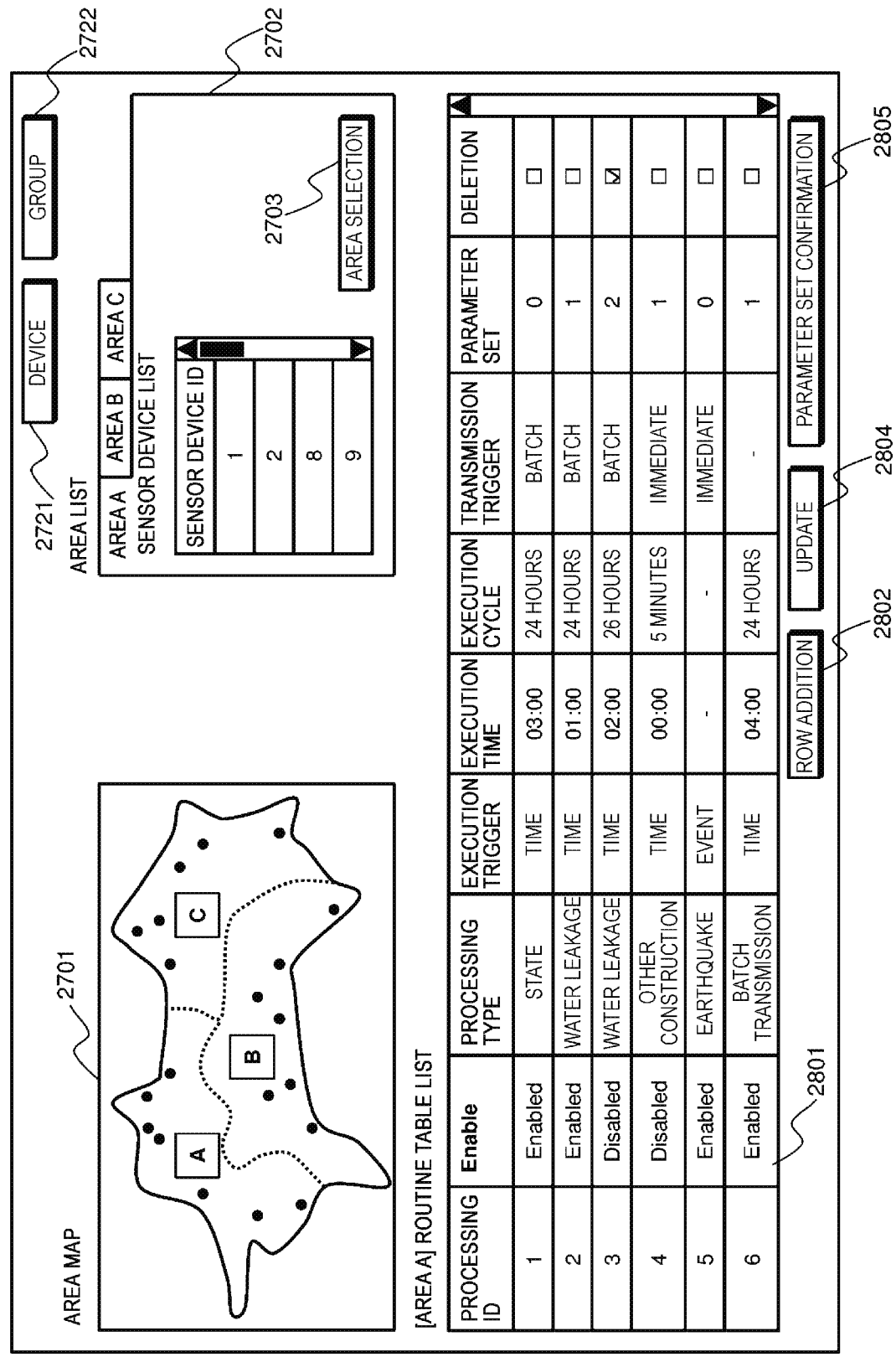
FIG. 28 is a display example of an area unit routine table confirmation screen according to the embodiment.
Figure 29:
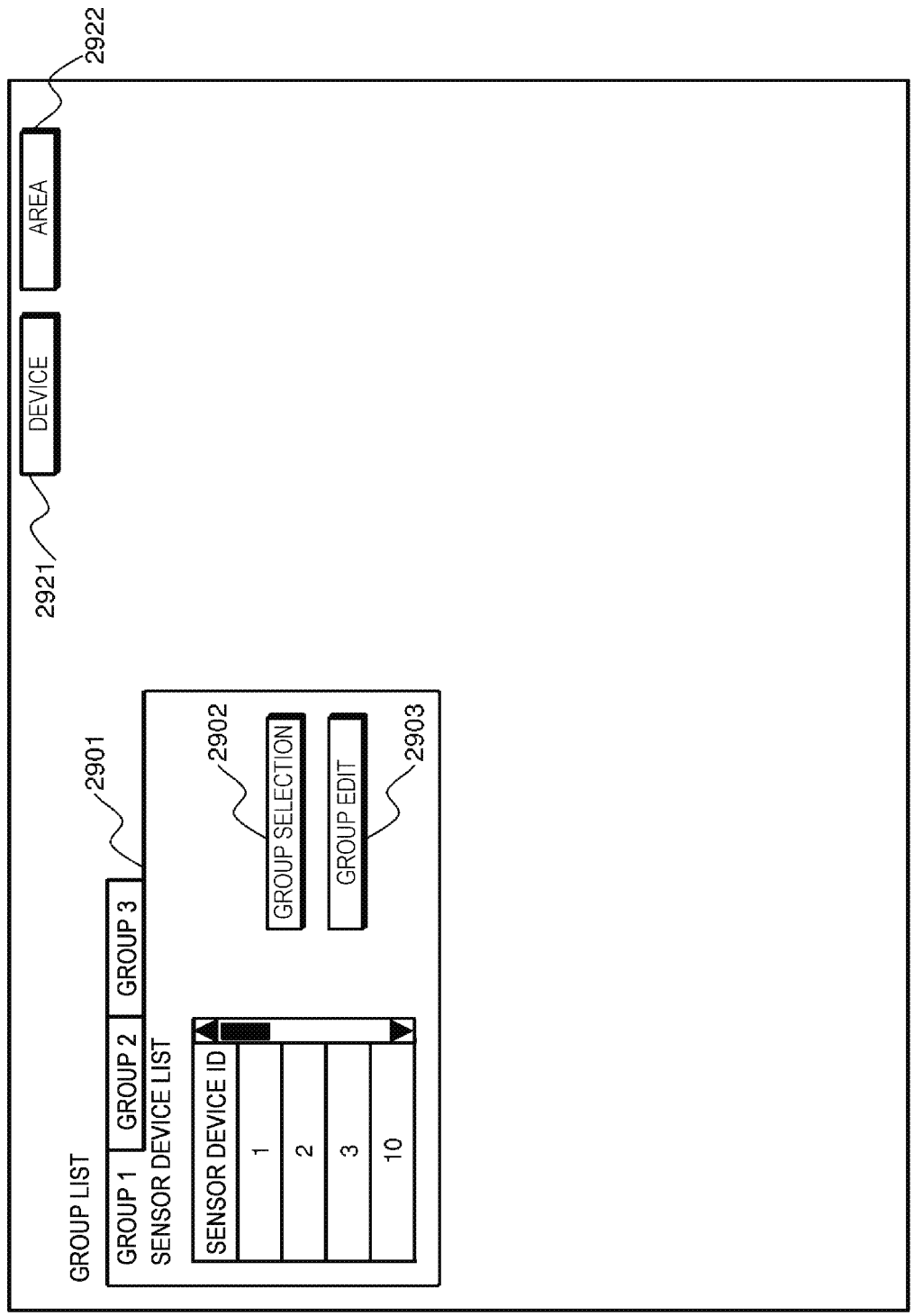
FIG. 29 is a display example of a group list display screen according to the embodiment.

FIGS. 27 and 28 are examples of display screens when the processing routine table is updated for each area, that is, when the processing routine tables of all sensor devices installed in an area are updated in a batch. FIG. 27 is an area list display screen. An area map 2701 is a map, and displays an area name and range of each area, and a sensor device installation location. An area list 2702 displays a list of sensor devices included in the area. In the area list 2702, when an upper tab is pressed, the display is switched to display of a different area. When the operator presses an area name of the area whose processing routine table is intended to be updated on the area map 2701 or presses an area selection button 2703 in a state where the area whose processing routine table is intended to be updated is displayed in the area list 2702, a transition to an area unit routine table confirmation screen of FIG. 28 is made. When a device button 2721 is pressed, a transition to the device list display screen of FIG. 23 is made. When a group button 2722 is pressed, a transition to a group list display screen of FIG. 29 is made.

FIG. 28 is the area unit routine table confirmation screen. In the area unit routine table confirmation screen of FIG. 28, a processing routine table 2801 that is commonly applied to the sensor devices in the area (here, area A) selected on the area list display screen is displayed. In the area unit routine table confirmation screen, processing routines can be added, changed, or deleted during editing of the processing routine table. In order to add a processing routine, a row addition button 2802 is pressed, Enable, a processing type, an execution trigger, a transmission trigger, and a parameter set ID are input to the added row, and an update button 2804 is pressed. In order to change the processing routine, an item intended to be changed is edited and the update button 2804 is pressed. In order to delete the processing routine, a check is made in a deletion field of the processing routine table 2801 and the update button 2804 is pressed. As described above, although the display contents and operation method are the same as the routine table screen for each sensor device in FIG. 24, FIG. 28 is different from FIG. 24 in that the processing routine table is updated in a batch for all sensor devices in the area.

When a parameter set confirmation button 2805 is pressed on the screen illustrated in FIG. 28, a transition to an area unit parameter set confirmation screen is made. As for the area unit parameter set confirmation screen, the display contents and the operation method are the same as those of the parameter set confirmation screen for each sensor device in FIG. 26, and thus the descriptions thereof are omitted.

As described above, by preparing an operation screen that updates the processing routine table 211 in a batch for each area for a plurality of sensor devices, even when a large number of sensor devices are installed, the operator can easily edit the processing routine table. In addition, by preparing an operation screen for updating the processing routine table for each area, it is possible to easily set a processing routine table in accordance with the characteristics of the area, such as soil where vibration is likely to increase, in the sensor device.

Figure 30:
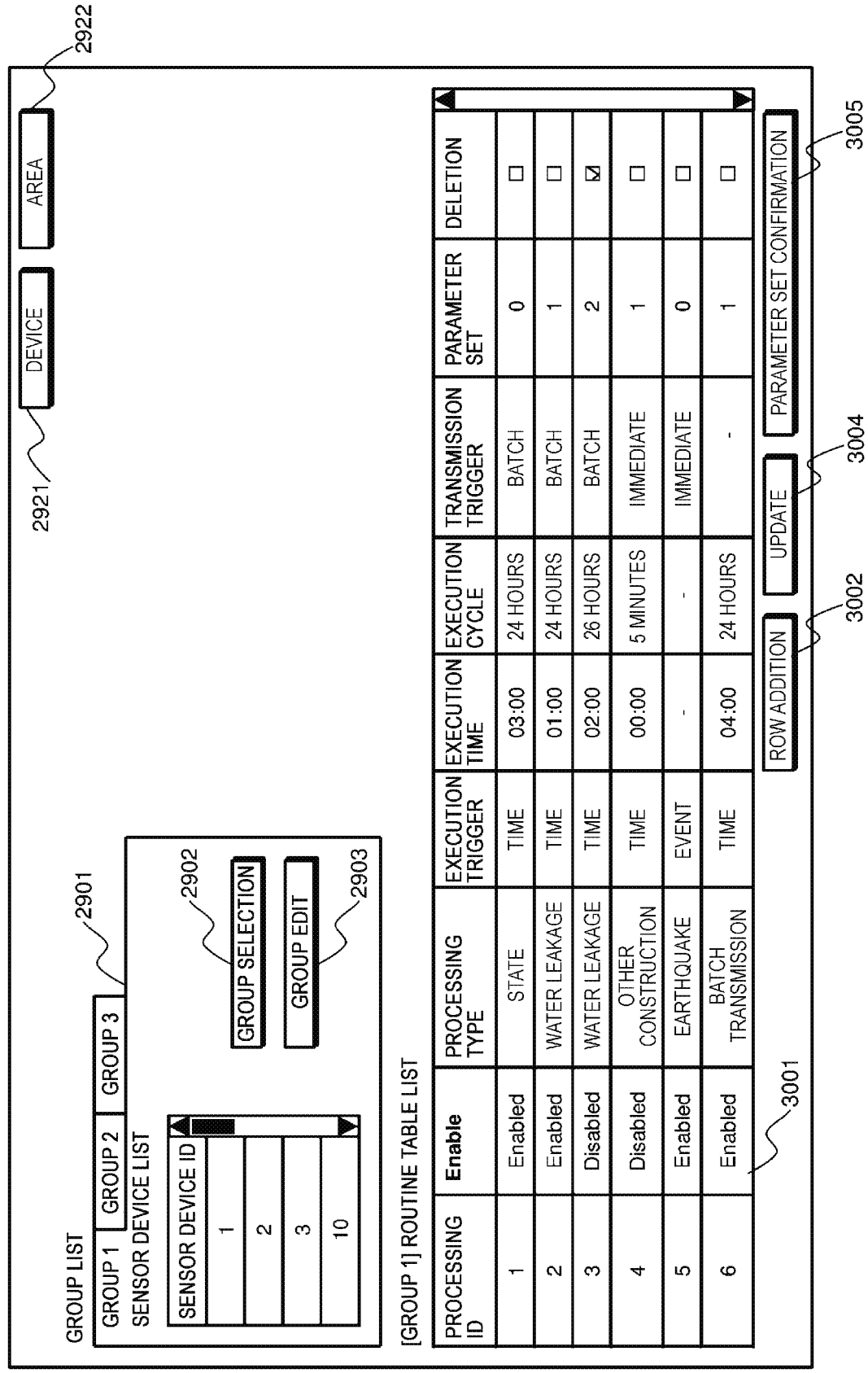
FIG. 30 is a display example of a group unit routine table confirmation screen according to the embodiment.
Figure 31:
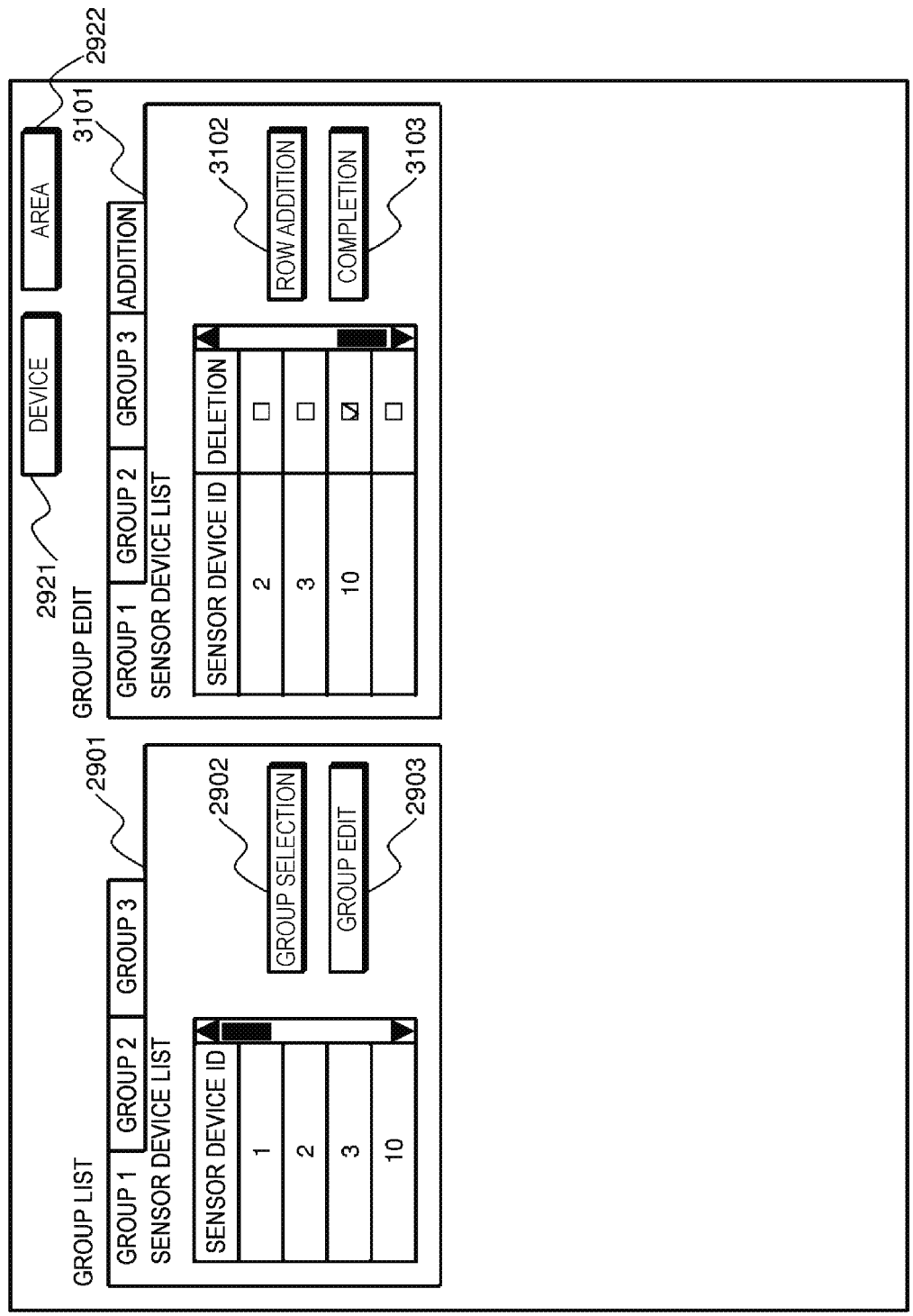
FIG. 31 is a display example of a group editing screen according to the embodiment.

FIGS. 29 to 31 are examples of display screens when updating the processing routine table for each group composed of one or more sensor devices designated by the operator, that is, when updating the processing routine table for all sensor devices belonging to the group. FIG. 29 is a group list display screen. A group list 2901 displays a list of sensor devices included in the group. In the group list 2901, when the upper tab is pressed, the display is switched to display of a different group. When the operator presses a group selection button 2902 in a state where a group whose processing routine table is intended to be updated is displayed in the group list 2901, a transition to a group unit routine table confirmation screen of FIG. 30 is made. When a group edit button 2903 is pressed, a transition to a screen changes to the group edit screen in FIG. 31 is made. When a device button 2921 is pressed, a transition to the device list display screen of FIG. 23 is made. When an area button 2922 is pressed, a transition to the area list display screen of FIG. 27 is made.

FIG. 30 is the group unit routine table confirmation screen. In the group unit routine table confirmation screen of FIG. 30, a processing routine table 3001 that is commonly applied to the sensor devices of the group (here, group 1) selected on the group list display screen is displayed. On the group unit routine table confirmation screen, processing routines can be added, changed, or deleted during editing of the processing routine table. In order to add a processing routine, a row addition button 3002 is pressed, Enable, processing type, execution trigger, transmission trigger, and parameter set ID are input to the added row, and an update button 3004 is pressed. In order to change the processing routine, an item intended to be changed is edited and the update button 3004 is pressed. In order to delete a processing routine, a check is made in the deletion field of the processing routine table 2801 and the update button 3004 is pressed. As described above, although the display contents and operation method are the same as the routine table screen for each sensor device in FIG. 24, FIG. 30 is different from FIG. 24 in that the processing routine table is updated in a batch for all sensor devices in the group.

In FIG. 30, when a parameter set confirmation button 3005 is pressed, a transition to a group unit parameter set confirmation screen is made. As for the group unit parameter set confirmation screen, the display contents and the operation method are the same as those of the parameter set confirmation screen for each sensor device in FIG. 26, and thus the descriptions thereof are omitted.

FIG. 31 is a group edit screen. On the group edit screen, sensor devices belonging to a group can be added or deleted. In a group edit display 3101, a list of sensor device IDs belonging to the group is displayed. When adding a sensor device to the group, a row addition button 3102 is pressed, a sensor device ID intended to be added is input, and a completion button 3103 is pressed. When deleting a sensor device from the group, a check is made in the deletion field of the sensor device ID intended to be deleted and a completion button 3103 is pressed.

As described above, by preparing an operation screen that updates the processing routine table in a batch for each group for a plurality of sensor devices, even when a large number of sensor devices are installed, the operator can easily edit the processing routine table. In addition, by preparing an operation screen for updating the processing routine table for each group created by the operator, it is possible to easily set a processing routine table in accordance with the characteristics of a group, for example, a group of sensor devices installed in a water pipe or a group of sensor devices installed in a gas pipe, in the sensor device.

In the description above, although one embodiment has been described, the present invention is not limited to the embodiment described above, and can be implemented with various modifications and applications.

For example, the functions of the sensor device 101 are not limited to the functions or programs illustrated in FIG. 2, and various sensors can be added or reduced according to needs. For example, in the example of FIG. 2, the other construction detection measurement processing program 223 may be unnecessary in an area where the other construction is not expected. On the other hand, in an area where gas is expected to erupt from the underground, it may be desirable to add a gas detection sensor and a gas measurement processing program.

In the embodiment described above, an expression of "table" is used, but is not limited thereto. The expression may be expressed as "chart", "list", or the like. Furthermore, the expression may be expressed using an expression that does not depend on a data structure, for example, "information" or "information group".

What is claimed is:

1. A sensor device comprising:
one or a plurality of sensors;
a memory that stores a program and data;
a processor that performs measurement processing by the sensor and transmission processing of sensor data generated by the measurement processing by executing the program; and
a communication unit that transmits the sensor data,
wherein the memory includes:
a buffer for storing the sensor data processed by the processor, and
a processing routine table that holds a processing routine configured to include, corresponding to an identifier for identifying processing performed by the processor, a type of the processing, an execution trigger of the processing, and trigger information that prescribes a trigger for transmitting the sensor data,
wherein the processor controls processing in the processing routine of the processing routine table based on the trigger information, so that the sensor data subjected to the measurement processing is immediately transmitted, or temporarily stored in the buffer and transmitted after a predetermined time,
wherein the memory stores, in the sensor device, a parameter set table in which a combination of parameters including a measurement time by the sensor, the number of samplings, and an observation frequency is prescribed, and parameter set identification information is assigned to each parameter set,
wherein the processing routine table has the parameter set identification information for each processing routine, and
wherein the processor adds or changes the parameter set identification information of the processing routine table based on the parameter set identification information defined in the parameter set table according to a command instruction.

2. The sensor device according to claim 1, wherein
the processor determines, based on a measurement processing result by the sensor, to transmit the measurement processing result immediately after the measurement processing is completed, or to store the measurement processing result in the buffer, regardless of the trigger information.

3. The sensor device according to claim 1, wherein
the processor adds, changes, or deletes contents of the processing routine table according to an instruction from the management server.

4. The sensor device according to claim 1, wherein
the processing routine table stores a plurality of measurement processing, and
the processing routine of the processing routine table includes information on the importance of measurement processing.

5. The sensor device according to claim 4, wherein
the information on the importance is operation-at-the-time-of-duplication information, and
when the sensor device is already executing another measurement processing (second measurement processing) when the sensor device is triggered for new measurement processing (first measurement processing), the processor determines, based on the operation at the time of duplication information, whether to execute the first measurement processing after the end of the second measurement processing, to continue the second measurement processing and cancel the first measurement processing, or to interrupt the second measurement processing and execute the first measurement processing.

6. The sensor device according to claim 4, wherein
the information on the importance is priority operation information, and
when the sensor device is already executing another measurement processing (second measurement processing) when the sensor device is triggered for new measurement processing (first measurement processing), based on the priority operation information, if the second measurement processing has a higher priority than the first measurement processing, the processor determines to continue the second measurement processing and cancel the first measurement processing, and if the second measurement processing has a lower priority than the first measurement processing, the processor determines to interrupt the second measurement processing and execute the first measurement processing.

7. The sensor device according to claim 1, wherein
the memory stores a timer queue table for managing a next execution start timing as a timer queue for processing whose execution trigger is time, and
the processor updates the timer queue in the timer queue table after immediately transmitting the sensor data or temporarily storing the sensor data in the buffer.

8. The sensor device according to claim 1, wherein
as the sensor, a vibration sensor and a water leakage detection sensor are included, the memory stores a measurement processing program for performing measurement processing of the sensor and generating the sensor data, a transmission processing program for performing transmission processing of the sensor data, a sensor device state detection processing program for monitoring the state of the sensor device, a water leakage detection measurement processing program, an earthquake detection measurement processing program, and a processing routine table update program for performing update processing of the processing routine table, and
the processor executes a plurality of the processing programs.

9. A sensor device management system comprising:
a sensor device and a management server that controls the sensor device and acquires measured sensor data, which are connected via a network,
wherein the sensor device includes:
one or a plurality of sensors,
a memory that stores a program and data,
a processor that performs measurement processing by the sensor and transmission processing of sensor data generated by the measurement processing by executing a program, and
a communication unit that transmits the sensor data,
the memory includes:
a buffer for storing the sensor data processed by the processor, and
a processing routine table that stores a processing routine configured to include, corresponding to an identifier for identifying processing performed by the processor, a type of the processing, an execution trigger of the processing, and trigger information that prescribes a trigger for transmitting the sensor data,
wherein the processor controls processing in the processing routine of the processing routine table based on the trigger information, so that the sensor data subjected to the measurement processing is immediately transmitted, or temporarily stored in the buffer and transmitted after a predetermined time,
wherein the management server;
receives a measurement processing result from the sensor device, and
instructs the sensor device to add, change, or delete a processing routine of the processing routine table,
wherein the memory stores, in the sensor device, a parameter set table in which a combination of parameters including a measurement time by the sensor, the number of samplings, and an observation frequency is prescribed, and parameter set identification information is assigned to each parameter set,
wherein the processing routine table has the parameter set identification information for each processing routine, and
wherein the processor adds or changes the parameter set identification information of the processing routine table based on the parameter set identification information defined in the parameter set table according to a command instruction.

10. The sensor device management system according to claim 9, wherein
the management server includes a processing device for executing a program, an input/output device including an input/output interface for displaying a display screen, and a storage unit, and
the display screen includes a sensor device list of a plurality of sensor devices, including a state of the sensor device, an installation area, and a confirmation status of the processing routine table for each of the sensor devices, and/or a list of contents of the processing routine table possessed by one sensor device selected from the sensor device list.

11. The sensor device management system according to claim 10, wherein
the display screen displays a list of contents of the processing routine table,
a row addition button for instructing addition of the processing routine in the processing routine table,
a deletion field for instructing deletion of the processing routine in the processing routine table, and
an update button for instructing change of an item in the processing routine of the processing routine table.

12. A sensor device management method in a system including a sensor device and a management server that controls the sensor device and acquires measured sensor data, which are connected via a network, the sensor device management method comprising:
in the sensor device,
a step in which one or a plurality of sensors measures a target,
a step in which a memory stores a program and data,
a step in which a processor executing the program performs measurement processing by the sensor and transmission processing of sensor data generated by the measurement processing,
a step in which a communication unit transmits the sensor data,
a step in which a processing routine table stores and manages a processing routine configured to include, corresponding to an identifier for identifying processing performed by the processor, a type of the processing, an execution trigger of the processing, and trigger information that prescribes a trigger for transmitting the sensor data, and
a step in which the processor controls processing in the processing routine of the processing routine table based on the trigger information, so that the sensor data subjected to the measurement processing is immediately transmitted, or temporarily stored in the buffer and transmitted after a predetermined time, and
in the management server,
a step of receiving a measurement processing result from the sensor device, and
a step of instructing the sensor device to add, change, or delete a processing routine of the processing routine table,
wherein the memory stores, in the sensor device, a parameter set table in which a combination of parameters including a measurement time by the sensor, the number of samplings, and an observation frequency is prescribed, and parameter set identification information is assigned to each parameter set, wherein the processing routine table has the parameter set identification information for each processing routine, and wherein the processor adds or changes the parameter set identification information of the processing routine table based on the parameter set identification information defined in the parameter set table according to a command instruction.

\* \* \* \* \*